US012579799B2

(12) United States Patent
Jayaraman

(10) Patent No.: US 12,579,799 B2
(45) Date of Patent: Mar. 17, 2026

(54) TRANSFER INSTRUMENT SECURITY AND ERROR DETECTION

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 462 days.

(21) Appl. No.: 18/171,867

(22) Filed: Feb. 21, 2023

(65) Prior Publication Data

US 2024/0282092 A1     Aug. 22, 2024

(51) Int. Cl.
| | |
|---|---|
| *G06V 10/82* | (2022.01) |
| *G06T 7/11* | (2017.01) |
| *G06V 10/44* | (2022.01) |
| *G06V 30/12* | (2022.01) |

(52) U.S. Cl.
CPC .............. *G06V 10/82* (2022.01); *G06T 7/11* (2017.01); *G06V 10/454* (2022.01); *G06V 30/12* (2022.01)

(58) Field of Classification Search
CPC ...... G06V 10/82; G06V 10/454; G06V 30/12; G06T 7/11
See application file for complete search history.

(56) References Cited

U.S. PATENT DOCUMENTS

| | | | |
|---|---|---|---|
| 8,708,227 | B1 | 4/2014 | Oakes, III et al. |
| 10,332,261 | B1 * | 6/2019 | Farivar ................... G06T 7/194 |

| | | | |
|---|---|---|---|
| 10,410,351 | B2 * | 9/2019 | Lin ........................ G06N 3/044 |
| 10,489,439 | B2 | 11/2019 | Calapodescu et al. |
| 10,552,810 | B1 | 2/2020 | Ethington et al. |
| 10,769,598 | B1 * | 9/2020 | Oakes, III ............ G06Q 20/108 |
| 10,853,198 | B2 * | 12/2020 | Marthala ................... G06F 8/75 |
| 10,970,768 | B2 * | 4/2021 | Zheng ................... G06V 20/63 |
| 11,210,505 | B2 * | 12/2021 | Pratten ................... G07D 11/34 |
| 11,295,377 | B1 | 4/2022 | Ethington et al. |
| 12,160,513 | B2 * | 12/2024 | Nyamwange ............. H04L 9/50 |
| 2010/0260408 | A1 | 10/2010 | Prakash et al. |

OTHER PUBLICATIONS

Truist Bank; Inventor Raphael Fitzgerald; U.S. Appl. No. 17/815,706, filed Jul. 28, 2022. Title: Method for Identifying Handwritten Characters on an Image Using a Classification Model.
Muhammad Mahbubur Rahman and Tim Finin; Deep Understanding of a Document's Structure; © 2017 Copyright held by the owner/author(s). ISBN 978-1-4503-5549-0/17/12 DOI: https://doi.org/10.1145/3148055.3148080; 11 pages.

* cited by examiner

*Primary Examiner* — Gregory M Desire
(74) *Attorney, Agent, or Firm* — Michael A. Springs, Esq.; Shumaker, Loop & Kendrick, LLP; Patrick B. Horne

(57) ABSTRACT

Disclosed are systems and methods for generating electronic instruments that implement electronic transfers. The system converts instruments to an electronic format using an imaging source. The image data is processed to determine content elements and segments of the electronic transfer instrument and to extract transfer data. The transfer data is validated to facilitate secure, accurate execution of the electronic transfer.

18 Claims, 6 Drawing Sheets

Cancel Capture

Image Capture Function

Virtual Endorsement

For Deposit Only to
Acc. No. XXXX-YYYY-NNNN

Global XYZ Corp.
111 Global Ln., U.S.A.

X
Sign Here

▲ Do not write below this line ▲

Official Use Only

Visual Guide

TRANSFER INSTRUMENT SECURITY AND ERROR DETECTION

TECHNICAL FIELD AND BACKGROUND

The present invention relates generally to the field of automated electronic transfer instrument creation, error detection and security.

Conventional techniques for resource transfers require manually processing transfer instruments before sending the transfer instrument to a remote entity for processing. Inconsistencies or errors in a transfer instrument are often not detected until days later after the transfer instrument has been sent to the remote entity. The errors and inconsistencies can cause the electronic transfer to fail such that it must be performed again. Repeating the electronic transfer might not be possible if the transfer source and the transfer target, or destination, are not in communication. Conventional techniques also expose sensitive elements of data included within the transfer instrument as human readable characters that could be copied and possibly used to generate unauthorized transfers.

To address the drawbacks of conventional techniques, the present systems and methods generate electronic transfer instruments that can be automatically validated, scanned for errors or inconsistencies, or corrected in real time before sending the transfer instrument to a remote entity. The result is an efficient, secure, automated process for initiating electronic transfers.

The electronic transfer instruments can be created using image data captured by a camera or scanner. The image data can be captured as individual images following user input commands instructing the device to initiate a capture where users are required to capture multiple images to capture all elements of data incorporated within the transfer instrument.

In other embodiments, the system can utilize an image source device to generate a continuous stream of sequential images (e.g., a video feed) that are analyzed to automatically identify images that suitable for generating an electronic transfer image, thereby resulting in less burden to a user and enhanced quality image data.

Images can be processed in real time to generate electronic transfer instruments. In other embodiments, the images can be saved to a local or remote storage device for later transmission or processing. Storing the images for later processing enhances the user's ability to transmit the transfer instrument to a third party or to create the images using a device or environment (e.g., better lighting) that is more conducive to image creation while deferring generation and processing of a transfer instrument until a time that is more convenient for a user or when network resources are more readily available.

To further enhance security of transfer instrument processing, some or all the transfer instrument can be encoded in a form that is non-human readable to help conceal sensitive elements of the transfer data.

SUMMARY

The system can generate electronic transfer instruments using image data captured by an imaging device, such as a camera or scanner. The imaging device can capture discrete frames of image data at a single instance in time, or the imaging device can capture dynamic image data consisting of a series of consecutive static images for evaluation to determine which static images are suited for generating an electronic transfer instrument. In some embodiments the image data is captured, stored to a database, and/or transmitted to a remote device for subsequent processing.

The image data is processed using a variety of techniques to read and convert the information contained in the transfer instrument, which includes typed and handwritten text, into machine encoded content elements. The content elements, which can be individual characters, are grouped into tokens (e.g., words or groups of words) that represent transfer data. The transfer data is used to implement the electronic transfer and can include information, such as a source identification (i.e., the transferor), a target identification (i.e., the transfer recipient), or transfer value data (i.e., the amount of the transfer).

In some embodiments, the system can segments transfer instruments into logical segments or components of the transfer instrument. The results of the segmentation is used to determine the types of transfer data represented by machine encoded content elements. For example, a group of machine encoded content elements can represent a source identification that is expected to be located within a particular component segment of the transfer image.

The electronic transfer image provides particular advantages of enabling automated validation of transfer data or augmentation data that comprises the electronic transfer instrument. The systems can readily extract and process transfer data and compare the data to known values to validate the transfer data, thereby enhancing security and accuracy. Digitizing such information also provides the advantage of automated validation and secure processing.

In one embodiment, a system for electronic transfer instrument security and error detection includes a computer with at least one processor and a memory device that stores data and executable code. The executable code causes the processor to transmit system configuration data to a network computer that compares the system configuration data to stored system configuration data and returns end user data. The system configuration data is unique to the computer being operated by user and can be used to verify the computer and user identity. The system returns end user data, such as a user identification or user product identification (e.g., account numbers).

The system activates a camera integrated or connected with the computer. The camera captures image data that comprises a transfer instrument image. The image data is read and converted to machine encoded content elements, such as handwritten or typed text characters, to identify text on the transfer instrument image. The transfer instrument is segmented into various components where transfer data can be found, such as a component for displaying a target identifier and another component where the value of the transfer is recorded. Each component comprises a map index corresponding to a location of the component within the transfer instrument image, and at least some components include transfer data elements.

The computer extracts transfer data elements from the transfer instrument image where the computer uses the map index to locate a component, and then reads the machine encoded content elements from the component. The computer then converts groups of machine encoded content elements to an extracted transfer data element. The computer compares the extracted transfer data elements against the end user data to verify a user's identity and ensure the transfer instrument is directed to the correct party. When the extracted transfer data element does not match the end user data, a notification is displayed to a user indicating that the user identifications do not match. When the extracted transfer data element does match the end user data, the transfer instrument image is used to generate an electronic transfer instrument.

In another embodiment, the end user data comprises an user identification, the extracted transfer data element comprises a target identification, and the computer detects errors with the target of the electronic transfer instrument by comparing the target identification to the user identification, the extracted transfer data element includes a transfer value. The user enters expected transfer value into an input function displayed by the computer. The computer detects errors with the amount of a transfer by comparing the transfer value to the expected transfer value.

The system can also verify transfer instruments when there are multiple owners of a particular account. The provider system returns end user data that comprises a co-user identification. The extracted transfer data elements comprises a target identification (i.e., a transfer recipient), and the computer detects errors with the target identification by comparing the target identification to the co-user identification.

Information input to the transfer instrument as an endorsement, or augmentation, are is subject to verification. The end user data received from a provider system can include an authorized user identification. The components of the transfer instrument image can include an augmentation or endorsement. The computer extracts transfer data from the augmentation that includes a target identification. The computer compares the target identification extracted from the transfer instrument to the authorized user identification. When the target identification does not match the authorized user identification, an error notification is displayed by the computer indicating that the transfer instrument was not endorsed by an authorized user.

The computer can include a neural network that is used to read and convert the image data to machine encoded content elements or used to segment a transfer instrument into components. Suitable neural network architectures for reading and converting image data to machine encoded content elements include a convolutional neural network and a recurrent neural network. The neural network can implement a clustering analysis using a neural network architecture selected from one of a Hopefield network, a Boltzmann Machine, a Helmholtz Machine, a Kohonen Network, a Self-Organizing Map, or a Centroid Neural Network.

In one embodiment that operates in a "continuous capture" mode, a camera connected or integrated with the computer captures video data of both sides of a transfer instrument. The video data, referred to a "dynamic image data," is continuous stream of image data that comprise of a series of sequential static images. The sequential static images in turn comprise a plurality of first side transfer instrument images and a plurality of second side transfer instrument images.

The computer evaluates the images of the first side of the transfer instrument followed by the second side (or vice versa). First, the computer detects edge boundaries for the transfer instrument first side. Then the computer reads and converts the first side of the transfer instrument image to machine encoded content elements to identify typed text and handwritten text on the first side transfer instrument image. The computer converts groups of first side machine encoded content elements to extracted transfer data elements.

The computer can include a database of expected transfer data elements that must be present and recognized to complete an electronic transfer. Thus, the computer compares each extracted transfer data element from the first side to a database or list of transfer data elements expected to be on the first side. When for a given first side transfer instrument image, the edge boundaries are detected and each expected transfer data element is detected on the first side, then the given first side transfer instrument image is stored as an accepted first side transfer instrument image. The computer ceases evaluating further images of the first side of the transfer instrument.

The computer proceeds with processing the images of the second side of the transfer instrument in the same manner to obtain an accepted second side transfer instrument image. Finally, the computer creates an electronic transfer instrument that includes the first side accepted transfer instrument image, the second side accepted transfer instrument image, and the first and second side extracted transfer data elements.

The system can also process the transfer instrument images by detecting sharpness and noise in the images and accepting only those images having sharpness or noise values within specified thresholders. For instance, the computer can detect a sharpness value for a transfer instrument image and compare the detected sharpness value against an image sharpness threshold. When the detected sharpness value falls below the image sharpness threshold, the computer ceases evaluation of the first side transfer instrument image and commence evaluation of the next first side transfer instrument image in the sequence of static images. Similarly, the computer can detect a signal-to-noise value for the transfer instrument image and compare the detected signal-to-noise value against an image signal-to-noise threshold. When the detected signal-to-noise value falls below the image signal-to-noise threshold, the computer ceases evaluation of the first side transfer instrument image and commence evaluation of the next first side transfer instrument image in the sequence of static images.

In yet another embodiment, the system processes existing images of transfer instruments stored to memory rather than require that users create new transfer instrument images and deposit them right away. The computer first loads image data from storage integrated with the computer where the image data comprises a transfer instrument image. The computer detect edge boundaries for a transfer instrument in the transfer instrument image, then converts the image data to machine encoded content elements to identify text characters on the transfer instrument image. As before the system can segment the transfer instrument image and extract transfer data elements used to create an electronic transfer instrument.

The transfer instrument image can be captured at a first time by a camera integrated or connected with a computer. The transfer instrument image is then loaded from storage at a second, later time, such as ten minutes or more later when it is convenient for the user. In some cases, the transfer instrument image is captured by a camera integrated or connected with a first computer. Then prior to loading the image data, the first computer initiates interface software (e.g., a provider mobile software application or a web portal) that establishes a secure link to a remote computer where the transfer instrument image is sent to implement the transfer. That is, the transfer instrument is created at a first computer before being sent to a second for processing, which is one advantage of utilizing stored data to generate electronic transfer instruments. In other cases, the transfer instrument image is sent to the transfer recipient, or target user. That is, the transfer data elements comprise a target user identification for a target user, and the electronic transfer instrument is transmitted to a remote computer operated by the target user.

The transfer instruments can be created from transfer data input by a user and stored for later processing to implement a transfer. Although the embodiments disclosed herein generally refer to transfer instrument images, formats such as a portable document format can be used, and the embodiments are not limited strictly to pixelated image data.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
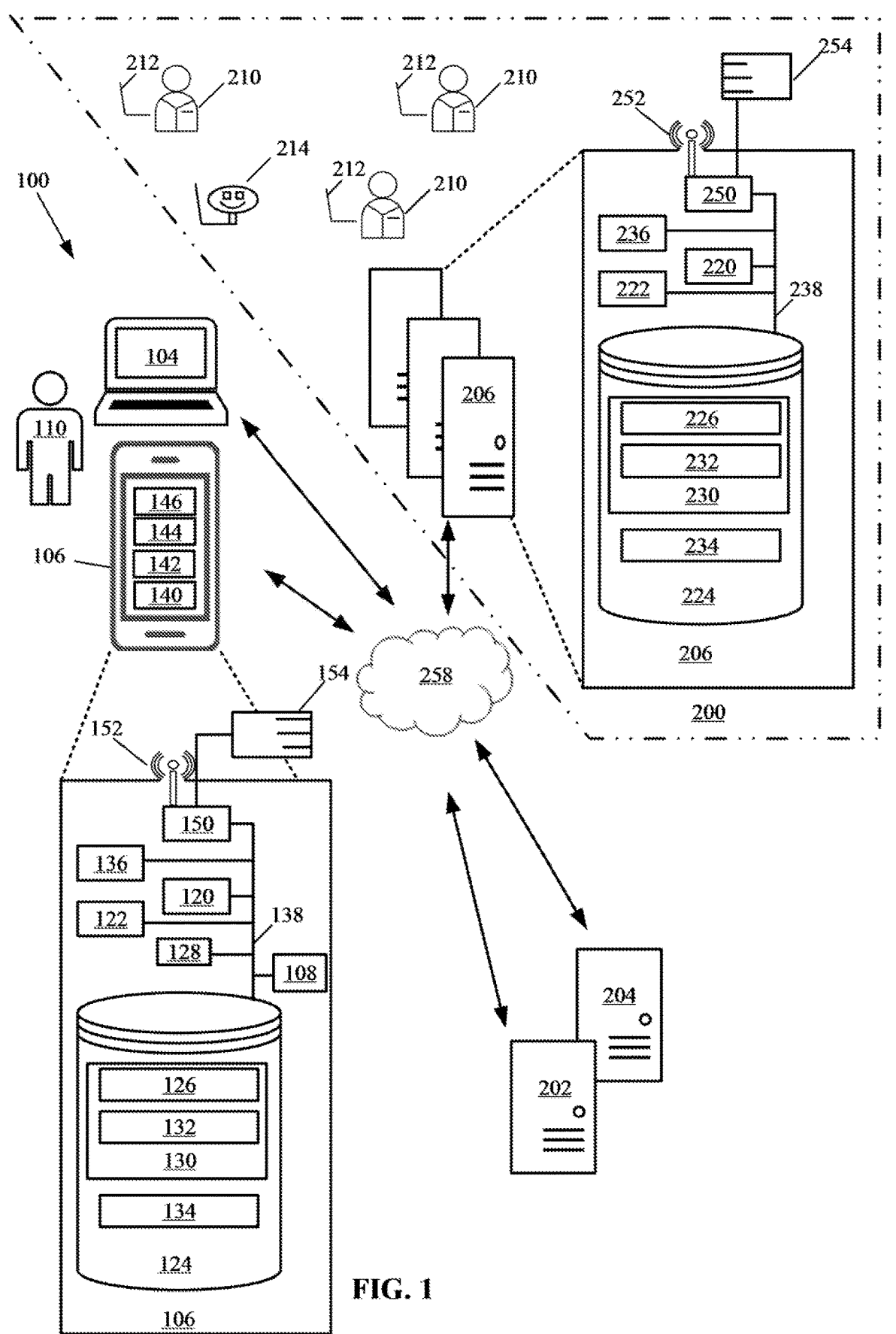
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to"

and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. The term "user" is used interchangeably with the terms end user, customer, or consumer, and these terms represent individuals to whom a provider is rendering goods or services or individuals and/or with whom the provider has an ongoing relationship.

The term electronic augmentation is used synonymously with the terms "virtual endorsement," or "virtual marking," and the term includes an electronic signature or other information used to securely authorize an electronic transfer as well as instructions used to process the electronic transfer. The term transfer instrument denotes a tangible or intangible record that includes information required to authorize and institute an electronic transfer, as discussed more fully below.

Embodiments are described with reference to flowchart illustrations or block diagrams of methods or apparatuses where each block or combinations of blocks can be implemented by computer-readable instructions (i.e., software). The term "apparatus" includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The mobile device 106 includes an input and output system 136 including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth® or Near-field communication ("NFC") protocols. Communications may also or alternatively be conducted via the connector 154 for wired connections such by universal serial bus ("USB"), Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

One subfield of machine learning includes neural networks. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

A feedforward network may include a topography with a hidden layer of nodes between an input layer and an output layer. The input layer includes input nodes that communicate input data, variables, matrices, or the like to the hidden layer that is implemented with one or more layers of hidden layer nodes. A first hidden layer generates a representation and/or transformation of the input data into a form that is suitable for generating output data. For network topologies having multiple hidden layers, the outputs of the first hidden layer feed a second layer of hidden nodes and so on until finally feeding the output layer of nodes. Adjacent layers of the topography are connected at the edges of the nodes of the respective layers, but nodes within a layer typically are not separated by an edge.

In at least one embodiment of a feedforward network, data is communicated to the nodes of the input layer, which then communicates the data to the hidden layer. The hidden layer may be configured to determine the state of the nodes in the respective layers and assign weight coefficients or parameters of the nodes based on the edges separating each of the layers. That is, the hidden layer implements activation functions between the input data communicated from the input layer and the output data communicated to the nodes of the output layer. The hidden layers are intermediate the input and output layers and are generally where all or most of the computation is performed.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT").

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Unsupervised learning software systems can perform training operations on unlabeled data and less requirement for time and expertise from trained data scientists. Unsupervised learning software systems can be designed with integrated intelligence and automation to automatically discover information, structure, and patterns from content data.

Unsupervised learning software systems can be implemented with clustering software techniques that include, without limitation: (i) K-mean clustering; (ii) Mean-Shift clustering; (iii) density based special clustering of applications with noise (e.g., DBSCAN); (iv) spectral clustering; (v) Principal Component Analysis; (vi) Neural Topic Modeling ("NTM"); (vii) expectation maximization (e.g., EM) clustering using Gaussian mixture models (e.g., GMM); (viii) agglomerative hierarchical clustering; (ix) Hopefield Networks; (ix) a Boltzmann Machines; (x) a Sigmoid Belief Net; (xi) Deep Belief Networks; (xii) a Helmholtz Machine; (xiii) a Kohonen Network where each neuron of an output layer holds a vector with a dimensionality equal to the number of neurons in the input layer, and in turn, the number of neurons in the input layer is equal to the dimensionality of data points given to the network; (xiv) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (xv) a Centroid Neural Network that is premised on K-mean clustering software processing techniques.

Clustering software techniques can automatically group similar data together to accelerate the derivation and verification a new classification or subject, and not just classification into an existing subject or classification. In one embodiment, clustering may be performed using a cluster model to group data points based on certain similarities using unlabeled data. Example cluster models may include, for example, connectivity models, centroid models, distribution models, density models, group models, graph based models, neural models and the like.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN may be configured to apply the convolution mathematical operation to the respective nodes of each filter and communicate the same to the corresponding node of the next subsequent layer. As an example, the input to the convolution layer may be a multidimensional array of data.

The convolution layer, or hidden layer, may be a multidimensional array of parameters determined while training the model.

An additional or alternative type of feedforward neural network suitable for use in the machine learning program and/or module is a Recurrent Neural Network ("RNN"). A RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous network layers.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

Generally, the neural network(s) of the machine learning program may include a relatively large number of layers (e.g., three or more layers) and are referred to as deep neural networks. According to various implementations, deep neural networks incorporate neurons, synapses, weights, biases, and functions and can be trained to model complex nonlinear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Different neural network architectures can be more particularly suited for particular uses to process different types of data inputs and render specific outputs. For example, different neural network architectures can be better suited to perform natural language processing and topic modeling while other types of neural network architectures are more well suited for predictive modeling of future expected data.

To implement natural language processing technology, for example, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) LSTM network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

To perform predictive analysis of expected future values of data, suitable neural network architectures can include various deep-learning techniques and specific architectures that include, but are not limited to: (i) LSTM network architecture; (ii) deep-learning, cyclic recurrent neural networks; (iii) an Elman recurrent neural network; (iv) convolutional neural networks; (v) multilayer perceptron networks; (vi) TensorFlow networks; (vii) MxNet networks; (viii) PyTorch networks; (ix) Keras networks; and (x) Gluon networks.

Recognizing Content Elements and Image Processing

Figure 2:
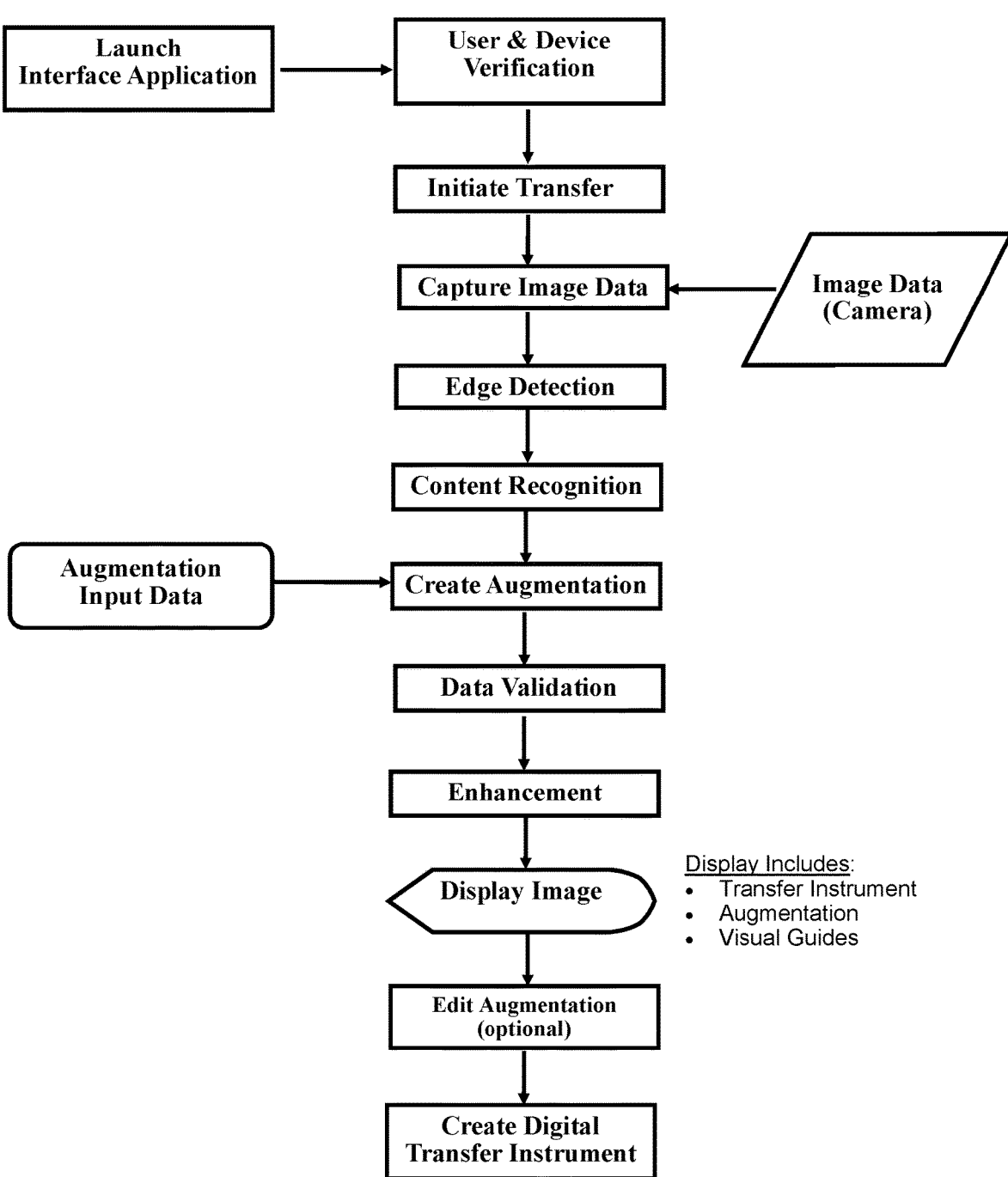
FIG. 2 is an example process according to one embodiment.
Figure 3:
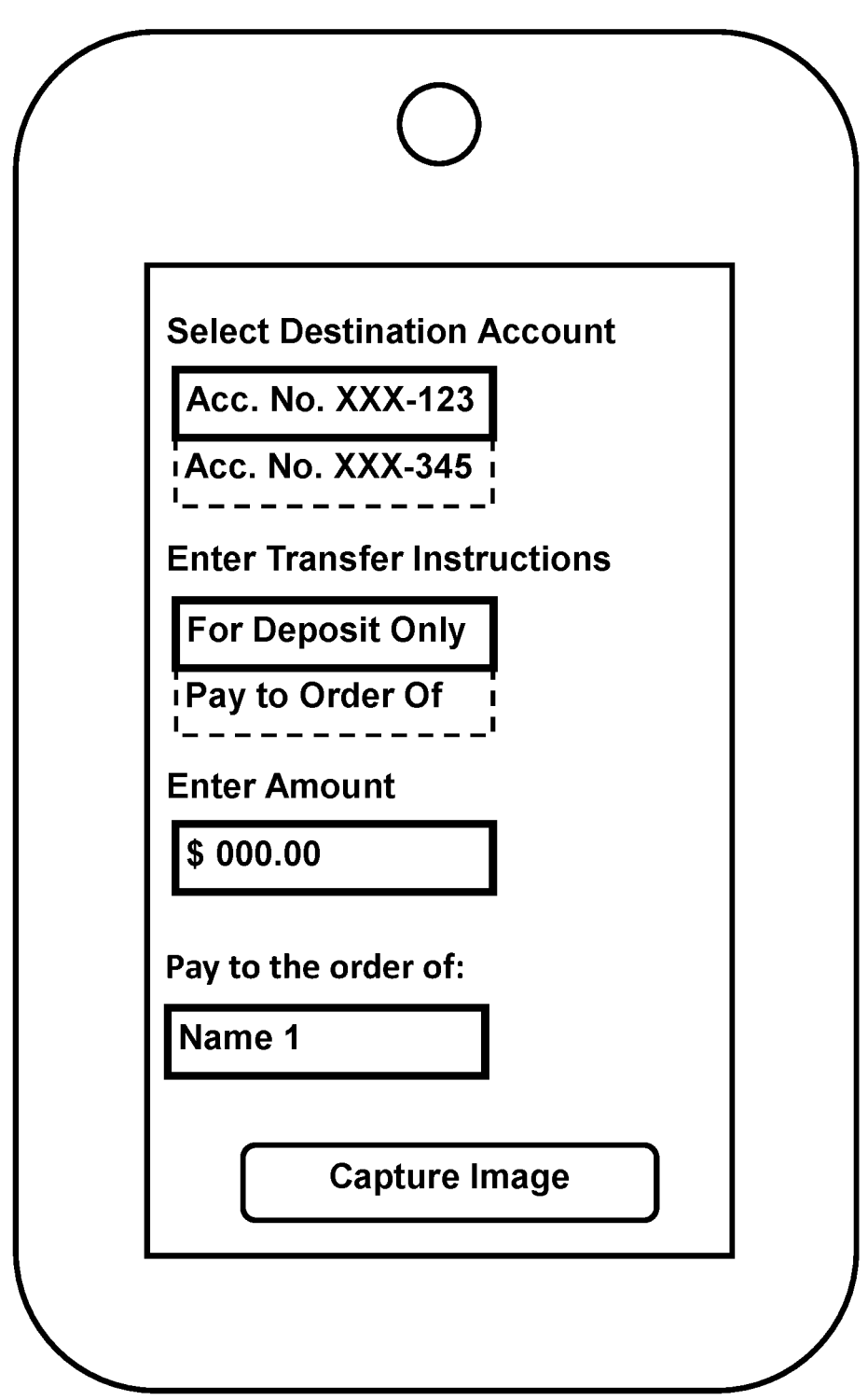
FIG. 3 is an example user interface according to one embodiment.
Figure 4:
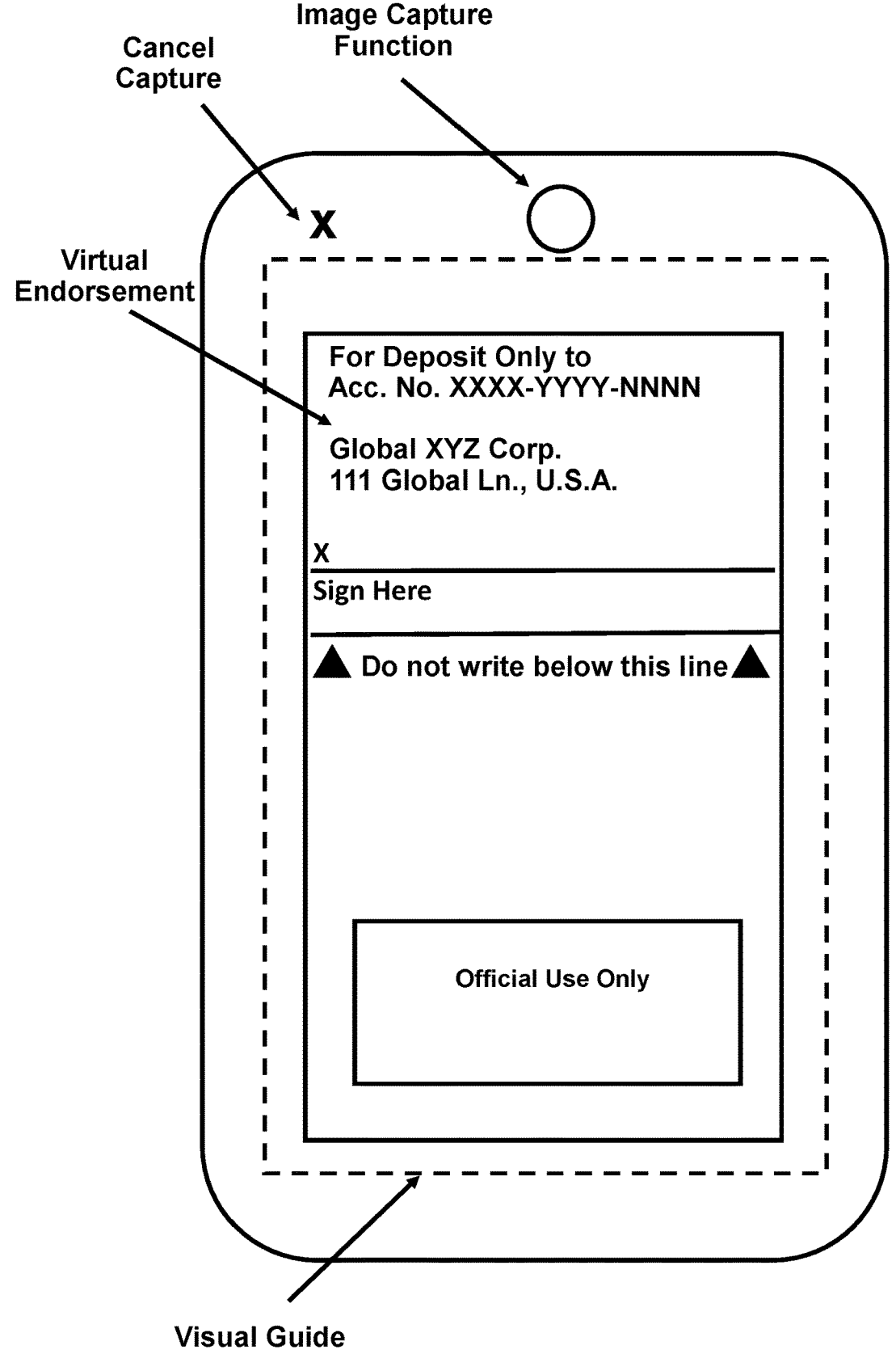
FIG. 4 is an example user interface for image capture and showing electronic augmentations according to one embodiment.

The present systems and methods create electronic transfer instruments based on image data captured or generated from a camera, scanner, or other device. An example process flow for capturing image data is shown in FIG. 2 and example interfaces for capturing image data are shown in FIGS. 3 and 4. The image data can be stored in one or more various image formats, such as a Joint Photographic Experts Group ("JPEG") compliant format, a tabbed image file ("TIFF") format, a bitmap format, or a Scalable Vector Graphics ("SVG") image format. In some embodiments, the electronic transfer instrument can be converted to, and stored as, a portable document format ("PDF").

The system processes the image data using a content recognition analysis to determine individual machine encoded content elements in the data, such as letters, numbers, characters, or symbols. To ensure human and machine readability of the image data, the system can include an Image Processing Module software component integrated with the user computing device or integrated with a provider device that performs one or more image enhancement operations. The enhancement operations can improve the accuracy of content recognition analyses that employs techniques such as edge detection, optical character recognition ("OCR"), intelligent character recognition ("ICR") that uses artificial intelligence techniques to recognize characters, magnetic ink character recognition ("MICR"), courtesy amount recognition ("CAR"), or legal amount recognition ("LAR").

Enhancement operations include, but are not limited to, one or more of the following functions: (i) de-skewing an image where the edges of the transfer instrument are rotated relative to the boundaries of the image (i.e., re-orienting the transfer instrument image to better align with the image boundaries); (ii) de-warping the image when the transfer instrument is tilted or folded such that some portions of the transfer instrument are closer to the camera than other portions (i.e., modifying portions of the transfer instrument image so that the transfer instrument appears to be perpendicular to the camera lens); (iii) binarization to convert the image to black-and-white pixels; (iv) de-speckling to remove positive and negative spots and to smooth edges present in the image; (v) line removal to eliminate non-glyph lines or shapes (i.e., shapes that do not form part of a character, such as inadvertent pen strokes); (vi) cropping pixels or portions of an image outside of the transfer instrument; (vii) down-sizing the image to a more suitable dots-per-square-inch ("DPI") size that is more efficient to process and transmit over a network; (viii) character segmentation to separate individual characters that might be linked by artifacts in an image (e.g., a hand-written cursive word that links characters, a user-inserted hyphen, or a stain or dark spot between characters that appears to improperly connect the characters); (ix) line and word detection; (x) script recognition to detect characters unique to particular fonts or languages that can be more efficiently compared against a known database of characters of the same language or font to identify the characters; and (xi) de-noising an image to reduce abrupt changes in pixel values throughout an image.

With respect to de-skewing, de-warping, and de-speckling operations, the Image Processing Module can employ techniques such as: (i) convex-hull algorithms that create a smooth polygon around the transfer instrument image and remove concavities; or (ii) a rotating calipers algorithm that determines the tightest fitting rectangle around the transfer instrument edges that can be used to determine the orientation angle of the transfer instrument to better align the transfer instrument with the image boundaries.

Following image enhancement operations, the Image Processing Module processes the image data that represents the transfer instrument using a content recognition analysis. The content recognition analysis locates and identifies the human-readable characters on the transfer instrument that form transfer data. The content recognition analysis can employ OCR or ICR processing techniques that generally include two methods: (i) component detection that defines a character by evaluating individual components such as lines and strokes; and (ii) pattern recognition that identifies entire characters. Both OCR and ICR techniques are generally referred to herein as OCR or character recognition techniques.

Content recognition techniques can include both traditional image processing to model-based detection. Image processing-based content recognition methods include Stroke Width Transform ("SWT") and Maximally Stable Extremal Regions ("MSER") that extract text regions based on edge detection and extremal region extraction, respectively. Deep-learning model-based software techniques may include Connectionist Text Proposal Network ("CTPN") and Efficient and Accurate Scene Text Detector ("EAST").

Once the transfer instrument image preprocessed and analyzed to determine constitute compoents, the content recognition analysis is either applied directly, or a further feature extraction stage may be applied. Deep learning-based solutions combine both feature extraction and content recognition in a single model. For input in the form of images, convolutional neural networks yield suitable results. Due to the sequence nature of text, a combination of Convolutional Neural Networks and bidirectional Long Short-Term Memory based Recurrent Neural Networks can also be applied as a basis for a content recognition software service. The final output of the bidirectional LSTM layers can be fed into Connectionist Temporal Classification ("CTC") layer to convert the sequence into feature vector ready for word classification.

In one embodiment useful for handwritten content recognition, the system groups consecutive strokes recognized in the image data. This results in a component graph where each node corresponds to at least one character hypothesis and where adjacency constraints between characters are handled by the node connections. Nodes are considered adjacent if the corresponding hypotheses have no common stroke but whose strokes are consecutive in the original input data.

The system can include a database of machine encoded content element character candidates with probabilities or recognition scores for each node of the component graph. These probabilities or recognition scores are based on a machine encoded content element recognition information database. The machine encoded content element recognition information database defines all the different characters and symbols of an alphabet underlying to the specified language. This information is language dependent and comprises general differences in alphabets as well as the ability to recognize various individual styles of writing the alphabets.

A first step in content recognition for one example embodiment can be based on a combination of dynamic and static features. The dynamic features can be extracted from the trajectory of the input stroke and are based on information such as position, direction, and curvature of the input stroke. Static features can be extracted from a bitmap representation of the input stroke and can be based on projections and histograms.

A second stage of content recognition can be classification of the features extracted by a pattern classifier such as a neural network. The neural network can be a multilayer perceptron or include an extra class enabling the neural network to reject node hypotheses corresponding to badly segmented characters. The system generates a list of character candidates with probabilities or recognition scores for each node of the segmentation graph. An alternative embodiment might make use of another kind of neural network such as Deep Neural Network, Convolutional Neural Network, or Recurrent Neural Network. Other types of pattern classifier could be used to address content recognition tasks, such as a support vector machine or a hidden Markov model.

The system generates linguistic meaning for the different paths in the component graph. The system checks candidates according to the machine encoded content element information available in a database. The machine encoded content element information can include a lexicon, a regular expressions, or the like. The system processes the image data to find the best recognition path or a recognition path having the lowest cost. Cost can be estimated from the probabilities or recognition scores of each node belonging to a path in the component graph. In one embodiment, the costs are estimated from the neural network probabilities by applying a logarithmic, non-linear function.

In one embodiment, the system does this by exploring a language model such as final state automaton (e.g., a determinist FSA) representing the content of linguistic information. In some embodiments, the system can utilize statistical information modeling for how frequent a word or a given sequence of words appears in the specified language or is used by a specific user. For instance, a word tri-gram language model may be used to evaluate the linguistic likelihood of the interpretation of a given path of the segmentation graph.

The first step in character recognition analysis is typically to convert image data to black-and-white pixels that are represented by a two-dimensional matrix. Within the matrix, a "1" denotes a black pixel, and a "0" denotes a white pixel. The Image Processing Module identifies regions of the matrix that represent a character, and segments the matrix regions surrounding a character into sub-region segments. The Image Processing Module compares each matrix sub-region segment to a database of matrices representing characters with different fonts. The comparisons are used to identify a character that the matrices most resemble statistically.

Figure 5:
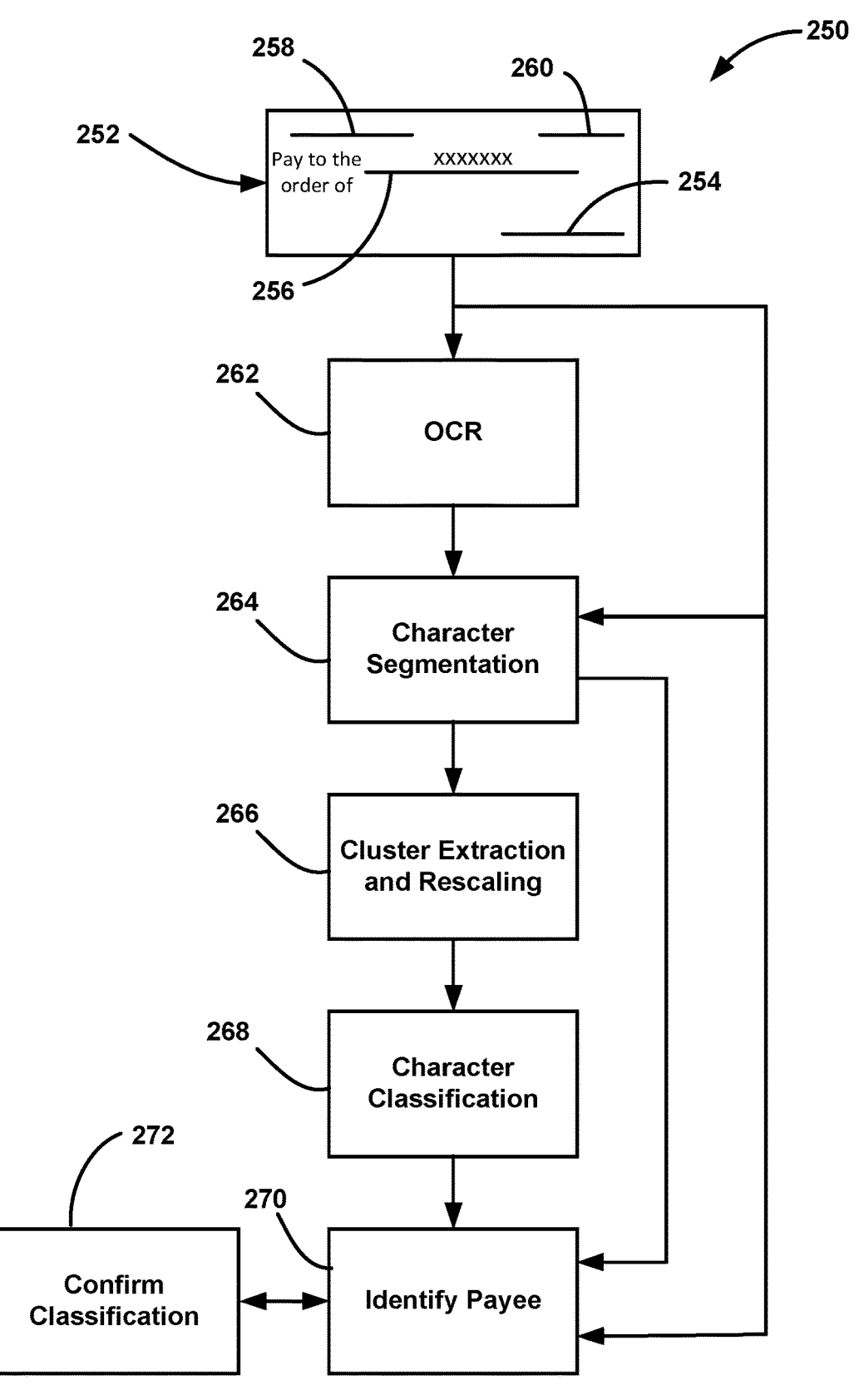
FIG. 5 is an example process for content recognition according to one embodiment.

In another embodiment, the Image Processing Module uses clustering analysis to perform OCR and identify characters. FIG. 5 depicts a flow diagram illustrating a process for identifying handwritten characters in an image. The transfer instrument includes a signature line 256, a line for source identification data 258, and a sequence data line 260 (i.e., a date), among other data fields. The images are subject to OCR processing at step 262 that reads and converts typed and/or printed text on the image 252 into machine-encoded text.

One suitable algorithm for this purpose is TESSERACT available through the PYTHON software suite. Such OCR algorithms read and convert typed text in the image 252 with a high degree of accuracy, but the algorithms may not always reliably read and convert handwritten text on a transfer instrument. An example of handwritten text is shown as the transfer instruction "pay to the order of" positioned next to the source identification data line 256 of the transfer instrument. The OCR algorithm is programmed to identify the expected location of the certain characters in the image or other suitable typed text in the image 252, such as recognizing that sequencing data generally appears to the right of printed text stating "date" or that source identification data generally appears in the upper left portion of an image.

The image 252 can be subjected to a density-based clustering algorithm that provides character segmentation at step 264 that also receives the location of the target identification data line 256 in the image 252. The image data can be converted to black and white with a "1" representing a non-white pixel and a "0" representing a white pixel. The clustering algorithm identifies clusters of non-white pixels in the area of the image 252 identified by the OCR algorithm. Each separately identified cluster may be, for instance, a handwritten character that is part of the source identification data that is handwritten proximate to line 256.

The section of the image 252 being examined is processed as a matrix of pixels where each non-white pixel is considered a data point for the clustering process. One suitable density-based clustering algorithm is Density-Based Spatial Clustering of Applications with Noise ("DBScan"), which is a density-based clustering non-parametric algorithm. Given a set of points in a set space, the DBScan algorithm groups together pixels that are closely packed together (i.e., non-white pixels with many nearby neighbors that are also non-white pixels). The algorithm also marks as outliers points that lie alone in low-density regions whose nearest neighbors are too far away (i.e., a pixel distance above a predetermined threshold). The output of the clustering algorithm is a dataset array that digitally identifies the X and Y coordinates of the pixels in each identified character cluster along with an assigned label for each cluster where the algorithm will assign the same cluster label to data points that are part of the same cluster.

The clustering algorithm is effective for identifying clusters of pixels in the image 252 that are part of the same character. However, some letters, such as, for example, capital "I," may look like two clusters to the algorithm because of the top and bottom bars in the letter. Handwriting heuristics can be employed to add constraints to the clustering algorithm to reduce the probability that more than one cluster dataset array is identified for the same character and/or one cluster dataset includes more than one character. For example, since the source identification data will be written from left to right on the transfer instrument, the clustering algorithm could be designed with a constraint where clusters cannot be stacked top to bottom on the transfer instrument relative to the handwriting direction of the source identification data. In other words, if two clusters are identified in a vertical direction at the same left to right location on the image 252, then that cluster can be considered a single cluster for one character.

Further, a limit to the size or area of the cluster can also be employed as a useful constraint. For instance, if the size of the cluster exceeds a predetermined threshold, then the Image Processing Module denotes the cluster as including more than one character. In that case, the Image Processing Module processes the group of pixels as comprising multiple clusters and characters. In other words, a constraint can be employed that limits the size of each cluster to be less than a predetermined maximum size. Also, a person will typically write in a manner where all of the characters are about the same size or width. If there is a significant inconsistency in the size of the clusters, then the cluster process can be further refined to identify additional clusters. In other words, a constraint can be employed that requires all of the clusters to be within a certain percentage size of each other.

The dataset array from the clustering algorithm is provided to a cluster extraction and rescaling algorithm at step 266 that extracts the individually identified clusters in the dataset array into individual dataset arrays and rescales each individual dataset array into, for example, a twenty-eight by twenty-eight (28×28) pixel cluster image, using extrapolation, which retains the main features of the image 252. The rescaling process also centers the cluster in the cluster image and adds border padding.

Figure 6:
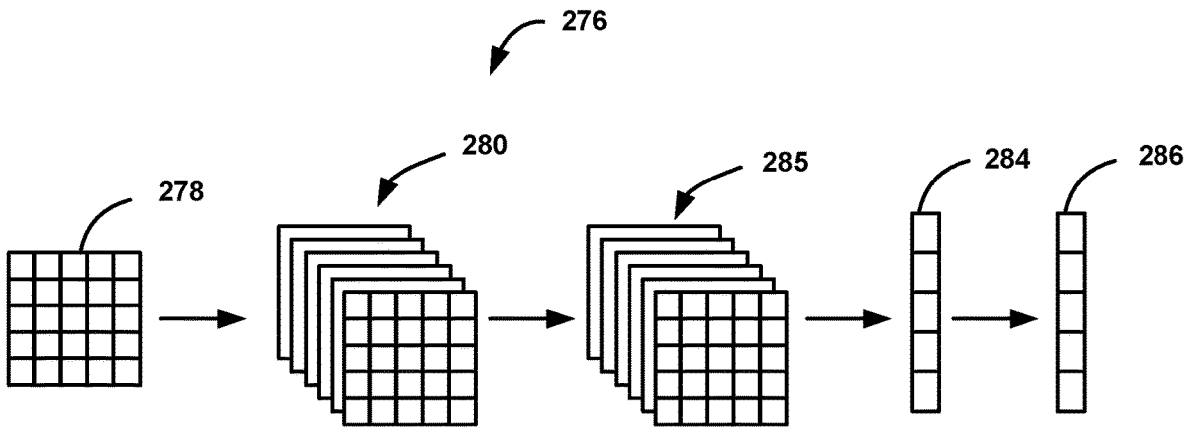
FIG. 6 is an illustration of a neural network that can be used in a character classification model.

Each individual cluster image 274 is provided to a character classification model at box 268 that classifies the likelihood that each cluster image 274 is a particular character. The classification model employs a neural network, such as convolutional neural network 276 shown in FIG. 6. The neural network 276 includes an input layer 278 that receives the cluster image 274, a convolutional layer 280 that classifies the image 274, a pooling layer 282 that reduces the dimensions of feature maps, a fully connected layer 284 that connects the nodes between layers, and an output layer 286 that outputs the classified characters.

The neural network 276 can be trained using a known set of training images, where each training image illustrates a letter or a number that has been assigned one of sixty-two character classes, namely, the upper case letters A-Z, the lower case letters a-z, and the numbers 0-9. The nodes in the neural network 276 are weighted, and those weights are tuned during the training process to allow the neural network 276 to determine what locations in the image 274 include non-white pixels of a particular character. The training process first feeds the neural network 276 character training images of known character values. Then the neural network 276 is fed character training images without identifying the characters. The node weights are adjusted based on correct character identification answers and incorrect character identification answers. The known set of training images could be the EMNISTIM dataset, which is a set of 697,932 handwritten character digits derived from the NIST Special Database 19 and converted to a 28 by 28 pixel image format and dataset structure.

During operation, the neural network 276 determines the likelihood that each image 274 is each of the sixty-two characters, and selects the character with the highest likelihood as the character for that image 274. The classification model outputs a string of characters from left to right along the source identification data line 256, for example, and identifies spaces between certain characters where non-white pixels do not exist as an indication of a separation between characters. The classification model can employ any algorithm suitable for the purposes described herein, such as PYTORCH clustering, which is an open source machine learning framework used for applications such as computer vision and natural language processing.

In some embodiments, the content recognition analysis can rely in part on MICR techniques. The MICR techniques generally require a dedicated magnetic reader device that is integrated with, or in signal communication with, the user computing device or provider terminal computing device. Portions of a transfer instrument can include characters printed or generated with magnetic ink or toner that are detected by the magnetic reader device to identify characters.

After performing content recognition and feature detection analyses, the system can perform a segment classification analysis to identify components of the transfer instrument represented by the recognized characters or machine encoded "content elements." In some embodiments, the system first identifies groups of machine encoded content elements (i.e., groups of letters or numbers) and compares the machine encoded content element groups against a database of known segments classifications, such as a payee field or a transfer value field. In other embodiments, natural language processing software can be used to identify groups of characters as representing a segment of the transfer instrument.

Transfer Instrument Segmentation

A segment analysis segments or divides a transfer instrument into logical sections or components. The segmentation can be based on transfer structure, such as lines between text, segment titles, line breaks, indentations, or combinations of such features. In one embodiment, the segments are identified using a categorizer that can be, for example, a probabilistic latent semantic analysis ("PLSA") model trained on a set of segment categories, such as the "pay to the order of field," a "date" field, or a "for"/note field. In one embodiment the categorizer is trained to detect the beginning of each section, for example, by classifying each group of machine encoded content elements or lines as being a segment identification or not (i.e., words or symbols denoting a segment of the transfer instrument).

The segmentation analysis can also divide a transfer instrument or document by splitting the image data into text and non-text sections. A non-text section may be an image or other drawing. Examples of a non-text section could include a provider logo or symbol, a handwritten or digital signature, a holographic image or watermark for security, a personalized mark for a user (e.g., a company logo, collect logo, ornamental drawings), a box to receive a transfer value amount, or a box or line that represents an input field such as an "X" mark to the left of an elongated line designated to receive a signature (e.g., a line that is denoted "X_____"). A text section is a collection of human readable machine encoded content elements or characters that can be processed by an OCR system. Examples of a text section could be denoted by the text "pay to the order of" or a series of numerical characters representing routing data or a product identification number.

Two techniques for segmentation include geometric segmentation and logical segmentation. According to geometric segmentation, a transfer instrument is split into text and non-text based on its geometric structure. A logical segmentation is based on its logical labels such as the "for" field, "pay to the order" of field, "endorsement" field or the like. Logical segmentation is a process of splitting digital text into words, sentences, paragraphs, topics or meaningful sections.

Identifying the structure of a transfer instrument image can rely on an analysis of font sizes or machine encoded content element positioning. In one example embodiment, transfer instrument parameters such as character size and spacing between characters, or words and lines are used to represent document physical layout. As an example, the second, or back side of a transfer instrument can include capital machine encoded content element characters stating "FOR OFFICIAL USE ONLY" or "Endorse Here" that designate segments of the transfer instrument. Software techniques used in physical layout analysis can include: top-down, bottom-up, or hybrid software analysis techniques.

Top-down software techniques start from the whole transfer instrument image and iteratively split it into smaller ranges. Bottom-up software techniques start from transfer instrument image pixels and cluster the pixels into connected components, such as characters that are then clustered into words, lines or zones. A mix of the two approaches is the hybrid approach.

One example bottom-up software technique includes using the K-nearest neighbors algorithm for each connected component of a transfer instrument side and uses distance thresholds to form text lines and blocks. Other examples include separating text components in graphics regions using a Hough transform. Top down approaches include the X-Y-cut algorithm based on recursively cutting a side of a transfer instrument into smaller rectangular areas. A hybrid approach can include identifying gaps between text and images and grouping the gaps into separators after horizontal smearing of black pixels.

In one embodiment, the system relies neural networks trained with annotated data that identify physically divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard machine encoded content element characters. The segment data identifiers may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from a transfer instrument based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

In yet other embodiments, the first step in image processing is to process image data using a Fully Convolutional Neural Network that uses the images of the transfer instrument as inputs and yields as outputs a map of probabilities of attributes predicted for each pixel. That is, each pixel is associated with probabilities that it belongs to a particular category of transfer data or transfer instrument segments that are identified by a provider during training. Training labels are used to generate masks and these mask images are the input data used to train the network. The second step of the content recognition analysis maps the predictions to the desired output of transfer instrument segments.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals.

In addition to segmenting the transfer instrument into logical sections or components, the system can extract transfer data by grouping machine encoded content elements into tokens, such words or groups of words that comprise the transfer data. To illustrate with a simplified example, the system processes an electronic transfer instrument image using a content recognition analysis to identify the individual machine encoded content elements, such as a series of characters "P," "a," "t," "r," "i," "c," and "k." The machine encoded content elements are grouped into tokens, such as words, and groups of tokens are identified as one or more clusters. Thus, the string of machine encoded content elements above is recognized as a token "Patrick." The token Patrick is identified as a name with semantic and heuristic processing techniques and grouped with additional tokens to identify a full cluster, such as the individual name "Patrick Smith" or the business name "Patrick Family Restaurants."

As another example, a string of machine encoded content elements and tokens "Deposit to Saving 1234" is identified as a cluster representing transfer instructions placed on a transfer instrument that denotes parameters for how an electronic transfer is conducted. The identification of content elements, tokens, and clusters of data is facilitated by a segment analysis that recognizes a structure of a transfer instruments where particular regions of a transfer instrument image represent specific elements of data, such as a written resource value data indicating the volume of resources subject to an electronic transfer.

As a further non-limiting example, the system can process image data representing a transfer instrument using a content recognition analysis to identify the string of machine encoded content elements "pay to the order of" adjacent to a string of handwritten, scripted machine encoded content elements "Patrick Smith." The system then performs a segment analysis to generate segmentation data identifying the "payee line" of a transfer instrument. The segment map index data identifies the payee line as being adjacent to the text "pay to the order of." The system identifies the handwritten machine encoded content elements "Patrick Smith" as being a payee user identification component of the transfer data. The user identification can be stored for later analysis, such as validating the correct user identification for enhanced security and accuracy.

Grouping machine encoded content elements into tokens or words can be performed using natural language processing technology alone or in combination with segmentation software processing techniques. In one embodiment, grouping machine encoded content elements can be performed by an extraction software module that is trained to label tokens and clusters according to classifications of transfer data, such as a transfer source identifier, a transfer target identification, a provider identifier, among other categories. The extraction software module can be implemented with a rule-based software technique, with probability models implemented by neural networks, such as Conditional Random Field system, or with combinations of rule-based techniques and neural networks.

Generating tokens can also be performed by detecting white spaces between machine encoded content elements. Morpho-syntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and token extraction can generate map index data that identifies the locations of segments and tokens with image data representing a transfer instrument. For example, each machine encoded content element (including spaces between tokens) can be indexed in a sequence using pixel coordinates. Segments and tokens can be indexed according to a first coordinate index and an index length. For example, transfer data for a target identification can have a location index coordinate and a length that maps the target identification data to a matrices of pixels within an image.

Natural Language Processing Technology

The present systems and methods process electronic transfer instruments using artificial intelligence and natural language processing technology to identify text data within the transfer instrument and to classify the text data. The system processes a transfer instrument by determining the overall structure of the transfer instrument according to various segments. Then within each segment, the system recognizes individual machine encoded content elements, such as characters, numbers, and symbols within the transfer instrument. The system next identifies what the machine encoded content elements represent by classifying various segments, or components of the transfer instrument.

Human-readable alphanumeric content data, or text data, representing linguistic expressions can be processed using natural language processing technology that is implemented by one or more artificial intelligence software applications and systems. The artificial intelligence software and systems are in turn implemented using neural networks. Natural language processing technology analyzes one or more files that include alphanumeric text data composed of individual communication elements, such as text characters, words, symbols, or numbers. Natural language processing software techniques can be implemented with supervised or unsupervised learning techniques. Unsupervised learning techniques identify and characterize hidden structures of unlabeled text data. Supervised techniques operate on labeled text data and include instructions informing the system which outputs are related to specific input values.

Supervised software processing rely on iterative training techniques and training data to configure neural networks with an understanding of individual words, phrases, subjects, sentiments, and parts of speech. As an example, training data is utilized to train a neural network to recognize that phrases like "Pay to the order of," "for deposit only," or "endorse here" all relate to the same general subject matter when the words are observed in proximity to one another at a significant frequency of occurrence.

Supervised learning software systems are trained using text data that is well-labeled or "tagged." During training, the supervised software systems learn the best mapping function between a known data input and expected known output (i.e., labeled or tagged text data). Supervised natural language processing software then uses the best approximation mapping learned during training to analyze previously unseen input data to accurately predict the corresponding output.

Supervised learning software systems require iterative optimization cycles to adjust the input-output mapping until the networks converge to an expected and well-accepted level of performance, such as an acceptable threshold error rate between a calculated probability and a desired threshold probability. The software systems are supervised because the way of learning from training data mimics the same process of a teacher supervising the end-to-end learning process. Supervised learning software systems are typically capable of achieving excellent levels of performance when enough labeled data is available.

Supervised learning software systems utilize neural network technology that includes, without limitation, Latent Semantic Analysis ("LSA"), Probabilistic Latent Semantic Analysis ("PLSA"), Latent Dirichlet Allocation ("LDA"), or Bidirectional Encoder Representations from Transformers ("BERT"). Latent Semantic Analysis software processing techniques process a corpus of text data files to ascertain statistical co-occurrences of words that appear together which then yields insights into the subjects of those words and documents.

Unsupervised learning software systems can be designed with integrated intelligence and automation to automatically discover information, structure, and patterns from text data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM"). Clustering software techniques can automatically group semantically similar content elements together to accelerate the derivation and verification of an underlying common segment—i.e., ascertaining or deriving a new segment or element of transfer data, rather than classifying transfer data into an adjacent segment. This permits the system, for example, to distinguish between the "payee" segment of transfer data being above or adjacent to the "transfer value data" or amount of resources being transferred.

The software utilized to implement the present systems and methods can utilize one or more supervised or unsupervised software processing techniques to perform a segment classification analysis to generate segment data that characterizes the segments of transfer data and other content within a transfer instrument. Suitable software processing techniques can include, without limitation, Latent Semantic Analysis, Probabilistic Latent Semantic Analysis, Latent Dirichlet Allocation. Latent Semantic Analysis software processing techniques generally process a corpus of text files, or documents, to ascertain statistical co-occurrences of words that appear together which then gives insights into the subjects of those words and documents. The system software services can utilize software processing techniques that include Non-Matrix Factorization, Correlated Topic Model ("CTM"), and KMeans or other types of clustering.

As part of a natural language processing analysis, the text representing the transfer data is vectorized to map the alphanumeric text into a vector form. One approach to vectorizing text data includes applying "bag-of-words" modeling. The bag-of-words approach counts the number of times a particular word appears in text data to convert the words into a numerical value. The bag-of-words model can include parameters, such as setting a threshold on the number of times a word must appear to be included in the vectors.

Techniques to encode the context of words, or content elements, to determine how often communication elements appear together. Determining the adjacent pairing of content elements can be achieved by creating a co-occurrence matrix with the value of each member of the matrix counting how often one content element coincides with another, either just before or just after it. That is, the words or content elements form the row and column labels of a matrix, and a numeric value appears in matrix elements that correspond to a row and column label for content elements that appear adjacent in the text data.

The text or symbols representing the content data is processed using a segment classification analysis to determine segment data that represents identifiers of segments of transfer data within the transfer instruments. The segment identifiers correspond to identifiable, discrete components of the transfer instrument, such as a routing data, a product identification, an augmentation, transfer value data, sequencing data, or user contact data, among other segments.

In one embodiment, the segment classification analysis is performed on the text data using a Latent Drichlet Allocation analysis to identify segment data that includes one or more segment identifiers (e.g., components of the electronic transfer instrument). Performing the LDA analysis on the transfer instrument content element data may include transforming the content elements into an array of text data representing key words or phrases that represent a segment (e.g., a bag-of-words array) and determining the one or more segment identifiers through analysis of the array. Each cell in the array can represent the probability that given text data relates to a given segment. A segment is then represented by a specified number of words or phrases having the highest probabilities (i.e., the words with the five highest probabilities), or the segment is represented by text data having probabilities above a predetermined subject probability threshold.

Clustering software processing techniques include K-means clustering, which is an unsupervised processing technique that does not utilized labeled text data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or content elements associated with each cluster, which can be referred to as segment data vectors. Segments may each include one or more segment vectors where each segment vector includes one or more identified content elements (i.e., keywords, phrases, symbols, etc.) within the transfer instrument text data as well as a frequency of the one or more content elements within the transfer instrument text data.

Named Entity Recognition ("NER") software processing techniques can be used to identify various content sources within the text data. NER techniques are utilized to classify a given word into a category, such as a person, product, organization, or location. Using NER techniques to process the text data allow the system to identify particular words and text as a noun and as representing a transfer source provider or user (i.e., a payer) or transfer target provider or user (e.g., a payee).

Neural networks are trained using training set text data that comprise sample tokens, phrases, sentences, paragraphs, or documents for which desired subjects, content sources, interrogatories, or sentiment values are known. A labeling analysis is performed on the training set text data to annotate the data with known segment labels, thereby generating annotated training set text data. For example, a person can utilize a labeling software application to review training set text data to identify and tag or "annotate" various segments within a transfer instrument.

The training set text data is then fed to a natural language software service neural networks to identify segments, transfer sources, and various other elements of transfer data and the corresponding probabilities. For example, the analysis might identify that particular text represents an augmentation, or "endorsement," with a 35% probability. If the annotations indicate the text is, in fact, an augmentation, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set text data to continue to increase the accuracy of the neural network.

Interfacing with a Provider System

The present systems and methods that allow end users to initiate, authorize, validate, and provide processing instructions for electronic transfers by creating an electronic transfer instrument. The systems and methods further allow users to generate, view, and apply electronic augmentations to an electronic transfer instrument. The electronic augmentations are utilized by a provider to process electronic transfers. The electronic augmentations provide information concerning the transfer, such as a user identification for the user receiving the transfer, a product identification, and instructions for processing the transfer.

Users initiate electronic transfers and apply electronic augmentations using one or more software applications that are integrated with a computing device that is being utilized by a user, such as a user personal or mobile computing device or a provider terminal accessed by a user. The software can be created and maintained by the provider, such as a provider "mobile app," or created by a third-party source, such as an Internet browser software application that is used to interface with a provider system. The software employed by users to interface with the provider system will generally be referred to as a Provider Interface Application.

The Provider Interface Application can be integrated with, or installed on, a user computing device, a provider terminal computing device, or another type of computing device utilized by the user. The Provider Interface Application can itself be comprised of one or more software services, software modules, or application programming interfaces ("APIs") that interface with the other hardware and software components integrated with a computing device. In some instances, the Provider Interface Application may "call," or interface with, APIs or software services integrated with the computing device operating system software.

In the present system, the Provider Interface Application can include or can interface with a Camera API that converts inputs entered by a user into software messages, commands, and data that is formatted for processing by the camera device in performing image capturing functions. A user may select a capture input function or a "flash" input function on the user computing device that the Camera API converts into a software command that causes the camera to take a picture and emit a flash of light to enhance the resulting image. As further non-limiting examples, the Provider Interface Application can include an Interface Service Module that generates graphical user interfaces ("GUIs") displayed to users or an Image Processing Module that performs functions that analyze, edit, or manipulate image data from the camera.

The user computing devices launch and run integrated software applications, such as a Provider Interface Application, to securely connect to the provider system to establish settings that are used to generate one or more electronic augmentations. The user computing devices also run the integrated software applications to digitize transfer instruments and apply the electronic augmentations before transmitting the transfer instrument and electronic augmentations to a provider for processing. Once a secure connection is established, end users navigate a series of GUIs to interact with the provider system and to digitize a transfer instrument by, for instance, capturing a photograph of the transfer instrument. The electronic augmentation is applied to the digitized transfer instrument and presented to the end user for verification before initiating the transfer. The user computing device interacts with components of a provider system, such as various network computing devices (i.e., a server).

In particular, user computing devices communicate with a provider system by sending data to and from external, public-facing component of the provider computing system, such as an external server that can be a web server or other external communication computing device. The external server in turn interacts with an internal interface computing device also associated with a provider computing system. Among other functions, the internal interface computing device is responsible for processing sensitive data gathered from the "back end" components of a provider computer system that may be protected by a firewall software application or system. The internal interface computing devices thus prevent third-party computing devices and applications and from having direct access to the sensitive data stored to a provider system.

The provider external server processes communication data requests sent to, and received from, the user computing device or from third party applications and computing devices. The external server routes communications requesting sensitive data through the internal server for secure communication. The internal server in turn communicates with other back end components of the provider system, such as databases and servers that store sensitive user data (e.g., account numbers, addresses, resource availability data or account balances, etc.).

In accessing the provider system, the user computing device transmits a user interface transmit command to the external server that can include: (i) an Internet Protocol ("IP") address for the user computing device; (ii) system configuration data; and (iii) navigation data (e.g., data corresponding to browsing history, or websites and Internet Protocol addresses accessed by the user computing device). In response to the user interface transmit command, the external server returns interface display data and a digital cookie that is stored to the user computing device and used to track functions and activities performed by the user computing device.

In some embodiments, the system configuration data and navigation data is utilized by the external server to generate the interface display data. For instance, the system configuration data might indicate that the user computing device is utilizing a particular Internet browser or mobile software application to communicate with the provider system. The external server then generates interface display data that includes instructions compatible with, and readable by, the particular Internet browser or mobile software application. As another example, if the navigation data indicate the user computing device previously visited a provider webpage, the interface display data can include instructions for displaying a customized message on the user computing device, such as "Welcome back Patrick!"

After receiving interface display data, the user computing device processes the display data and renders GUI screens presented to users, such as a provider website or a GUI within a provider mobile software application. In some embodiments, the system configuration data may be sent to the provider system in a separate message subsequent to the user interface transmit command message.

The interface display data can include one or more of the following: (i) webpage data used by the user computing device to render a webpage in an Internet browser software application; (ii) mobile app display data used by the user computing device to render GUI screens within a mobile software application; (iii) user transfer data, or just "transfer data," that is used by the user computing device to render a webpage GUI that provides users access to view user resource availability data (e.g., account types and balances) and to view, select, and establish transfer instruction parameters. Categories of interface display data can include graphical elements, digital images, text, numbers, colors, fonts, or layout data representing the orientation and arrangement graphical elements and alphanumeric data on a user interface screen.

The user computing device may also transmit system configuration data to the provider system that is used to verify a user identify or authenticate the user computing device. System configuration data can include, without limitation: (i) a unique identifier for the user computing device (e.g., a media access control ("MAC") address hard-coded into a communication subsystem of the user computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device can capture geolocation data that is used to authenticate the device or to create an electronic augmentation. The geolocation data can be captured from a global positioning system integrated with the user computing device. In other embodiments, the provider system can determine location data for the user computing device based on the user device IP address. The provider system includes a software application that transmits the user device IP address to an Identity & Location API that utilizes the device IP address to determine an approximate geographic location of the user computing device. The Identity & Location API passes the user device IP address to a database or a third-party software service that returns geographic location data for the user device IP address, such as a city, county, or state. The Identity & Location API stores the geographic data to a database record on the provider.

The user computing device authenticates to the provider system if the user has an existing electronic account with the provider. The user computing device navigates to a login GUI and enters authentication data, such as a user name or unique user identification, a password, a personal identification number ("PIN"), an alphanumeric code, or biometric information (e.g., a fingerprint or facial recognition). The authentication data, also known as user security data, can correspond to data and information that is known by the provider to be in possession of the user. The user then selects a submit function on the login GUI to transmit an authentication request message to the provider including the possession element data.

In some embodiments, the authentication data and/or authentication request message can further include elements of the system configuration data that are used to authenticate the user, such as a user computing device identification or a user device IP address. For example, upon launching the Provider Interface Application, the user enters a fingerprint or a PIN code. The user computing device automatically gathers system configuration information that is sent to the provider system along with the authentication data within an authentication request message.

The provider system passes the authentication request message to an identity management service, which performs a verification analysis to verify the identity of the user or user computing device. The verification analysis compares the received authentication data to stored user authentication data to determine whether the received and stored authentication data sets match. The identity management service, thus, determines whether a correct user name, password, PIN, biometric data, device identification, or other authentication data is received.

In some embodiments, the identity management service receives authentication data that includes biometric data or a PIN code with or without system configuration data. The identity management service utilizes the received authentication data to determine the user identification based on a query to the provider database. The user thus enters non-identifying information such as a PIN that is used along with or without system configuration data to identify the user.

Once the verification analysis verifies the end user and/or user computing device, the identity management service returns an authentication notification message to a provider external server. The authentication notification message includes a verification flag indicating whether the verification passed or failed and a reason for a failed authentication, such as an unrecognized user name, password, PIN, biometric data, or user computing device identification.

The user authentication request message can also include system configuration data, and the provider's back end servers can use system configuration data and user account data to perform the authentication process. As one example, the identity management service might store a user computing device MAC address to a database record as part of the user account data. Upon receipt of an user authentication request message that includes a MAC address, the identity management service compares the received MAC address data against stored MAC address data that is associated with the user account data. In this manner, the user computing device can also be authenticated to the provider system. If the received and stored MAC addresses do not match, the identity management service returns an authentication decision message to the external server indicating the authentication failed because the user computing device could not be authenticated. The external server can then prompt the user to verifying whether the consumer is using a new device to login to the provider system, and if so, begin the process of registering a new device to the provider's system.

The system verification analysis can also utilize multifactor authentication techniques ("MFA") to authenticate the user identity or a user computing device. As one example, if the user authentication data is successfully verified, a MFA software process running on the provider system can initiate a telephone call or send a short message service ("SMS") text message to a phone number stored as part of the verification analysis. Upon receiving a call, the user selects an input function on the telephone to transmit response data to the MFA software process that confirms receipt of the call, thereby further authenticating the user's identity. The function can be the user's selection of any key on the telephone or a pre-determined sequence of keys, such as a passcode. Alternatively, on receiving a SMS text message that includes a numeric or alphanumeric code, the user enters the code into a user interface such as the Provider Interface Application or website. The code is transmitted to the MFA software process to verify receipt by the user.

Those of skill in the art will appreciate that other forms of MFA are possible, such as sending a text message containing a passcode to the user's cellular phone that must be entered into a user interface screen or utilizing a separate software application running on the user computing device to generate a key or passcode that is verified by the provider system.

The provider system stores a variety of end user data that characterizes the end user and the end user relationship to the provider. The end user data is utilized in generating electronic transfer instruments, authenticating end user identification, generating augmentations, among other functions.

The end user data is stored to an End User Database as user profile database records and includes, without limitation: (i) a user identification; (ii) user contact data, such as a mailing address or a geographic region where the user resides (e.g., a zip code, city, state); (iii) user source data, such as user telephone number data, user device IP address, an email address, or a social media account name; (iv) co-user or co-authorized user identification(s) that identify other users who are authorized to use a given provider product; (v) one or more account identifications or provider product identifiers that indicate the accounts or products currently held by a user; (vi) location data, such as a geographic position as determined from a Global Positioning System ("GPS") integrated with the user computing device or from a user computing device IP address; (vii) user activity data that is representative of various functions or selections utilized by a user; (viii) system configuration data; and (ix) navigation data.

The user activity data can include a wide variety of information that tracks activities of a user when utilizing a provider system. Examples of user activity data include, but are not limited to: (i) a log of user attempts to access a provider system, including the date, time, device used, and device IP address; (ii) navigation data, including the GUIs accessed by a user while logged into the provider system; (iii) settings edited by a user or selections made by a user (e.g., a selection to view or decline to view a notification or message); (iv) a log of written communications between a user and a provider, including the communication content data, a date, time, an identifier for the device used, and a device IP address; (v) a log of support requests or telephone calls between a user and a provider; (vi) resource transfers logs; or (vii) other functions and activities performed by a user that are capable of being recorded electronically.

Establishing Electronic Augmentations

Prior to initiating an electronic transfer, users establish electronic augmentations that can be applied to digitized transfer instruments. User computing devices establish a secure communication session with the provider computing system that authenticates the user identity and the user computing device, which can be preregistered with, and known to, the provider system. Users navigate a series of GUIs to view and edit user product settings and information, communicate with the provider, and initiate electronic transfers, among other functions. The products can be an account, such as a checking account, savings account, credit card account, loan account, or brokerage account, among other types of provider services and products. Users can be associated with one or more provider products, such as a user that has multiple accounts established with a provider. Conversely, each product can be associated with multiple users, such having multiple users authorized to use a single product or account.

Users can establish one or more distinct electronic augmentations and permissions for each product. The electronic augmentations and permissions define, for example: (i) the identity of users that are authorized to initiate or approve a resource transfer for each product; (ii) transfer instructions for processing a resource transfer; and (iii) the particular transfer instructions that each user is permitted to authorize.

The permissions are stored as role data in a augmentation settings database on the provider system. The system performs a role data check prior to processing a transfer instrument to determine the scope of a user's permissions in processing a transfer instrument. The role data can include, without limitation: (i) an initialization indicator having a first value if the user permitted to initiate and authorize an electronic transfer and a second value if the user is not permitted to initiate an authorize an electronic transfer; and (ii) transfer instruction role data that indicates the type of transfer instructions a user is permitted to initiate or authorize. A unique user identification, the initialization indicator, and the transfer instruction role data are stored as a augmentation settings database record in the augmentation settings database. The augmentation settings database is implemented as a relational database that maintains an association or correlation between the various data types stored to the augmentation settings database record.

The transfer instruction data defines particular actions taken when processing an electronic transfer of resources. Transfer instruction data can include, without limitation, instructions specifying: (i) a product identification for an account that will receive resources being electronically transferred; (ii) restrictions on the transfer destination, such as a "for deposit only" instruction that requires the entire amount or value of the resources being electronically transferred to be deposited into a single account associated with a specified product identification; (iii) that the resources being electronically transferred should be directed to a third party, such as a "pay to the order of" instruction; or (iv) that the transfer is directed to a particular beneficiary or for a dedicated purpose, such as a "for the benefit of" instruction whereby the electronic transfer is directed to a specified third party account and to be used for a named third party or purpose.

The utility of being able to establish multiple distinct, electronic augmentations that are applied in a consistent manner is illustrated with the following simplified, non-limiting examples. In a commercial context, a business might have a brand name or a "doing-business-as" ("d/b/a") name that is different from the name of the juristic legal entity under which the business operates, such as a restaurant called "Patrick's Patties" that operates under a juristic business entity named "Patrick Family Restaurants, LLC." The business might have multiple accounts with a provider that are each titled in the juristic entity name. Further, each account can have different authorized users, such as a first "owner" account having the business owner as the only authorized user and a second "operating" account having two managerial employees as authorized users.

In the above example, third parties might regularly initiate transfers through prepared transfer instruments that specify "Patrick's Patties" (i.e., the "d/b/a" name) as the transfer recipient even though the accounts are titled under the name "Patrick Family Restaurants, LLC" (i.e., the juristic entity name). When processing a transfer instrument, a provider is often not able to determine the proper recipient if the recipient named in the transfer instrument does not match how an account is titled. Moreover, when utilizing conventional marking techniques, some users such as the managerial employees in the foregoing example, might not appreciate that business accounts are titled under a different name than the d/b/a name specified in the transfer instrument. Thus, to ensure transfers are properly routed, standardized electronic augmentations can be established that specify the transfer recipient as "Patrick Family Restaurant, LLC d/b/a Patrick's Patties"—i.e., a marking that links the recipient named in the transfer instrument to the name in which the provider products or accounts are titled. The standardized electronic augmentations are automatically applied to the transfer instruments thereby reducing or eliminating potential errors when identifying the transfer recipient within a marking or electronic augmentation.

As a further example, the above business can establish at least two standardized electronic augmentations corresponding to the two accounts. That is, a first electronic augmentation for the owner account can include a product identifier associated with the owner account, and a second electronic augmentation can include a product identifier that is associated with the second, operating account. When applying electronic augmentations to the transfer instrument, a user can apply an electronic augmentation that specifies the desired destination account or provider protect.

With regard to permissions, the above business can specify role data that limits the electronic augmentations that the two managerial employees are authorized to apply to transfer instruments. The identity of the managerial employees is ascertained from authentication data or system configuration data used to authenticate the managerial employees and their computing devices when accessing the provider system. As an example, the managerial employee's unique user identifications can be associated with role data and transfer role data in the augmentation settings database that allows the managerial employees to only specify "for deposit only" transfer instructions and to only specify the "operating account" as a recipient account. Thus, when the managerial employees initiating and authorizing electronic transfers, the system performs a role data check and automatically generates and applies electronic augmentations associated with restrictive "for deposit only" transfer instructions and the operating account product identification. On the other hand, the owner in the foregoing example may not be restricted with regard to applying electronic augmentations.

To establish one or more electronic augmentations, users navigate to a Augmentation Settings GUI that receives augmentation settings data from users that is used to create electronic augmentations. Augmentation settings data can include, without limitation: (i) digital signature data, which can be an image of a handwritten marking or a series of alphanumeric characters or symbols used to identify an user and that serve as a user authorization input; (ii) a target product identification (e.g., an account number or name to receive the electronic transfer); (iii) user contact data, such as a mailing address, a geographic region designating the user's principal location (e.g., a zip code, city, state), an email address, or telephone number; (iv) authorized user identification data, such as a name, user name, or identification number that identifies users authorized to apply electronic augmentations; (v) role data indicating the actions an user is permitted to take, such as applying certain electronic augmentations that contain transfer instructions; (vi) transfer instruction data that designates how an electronic transfer should be processed; and (vii) marking instruction data that can establish restrictions and rules for how electronic augmentations are applied to a transfer instrument, such as applying a particular electronic augmentation to transfer instruments originating from a particular transfer source identification.

The augmentation settings data is used to generate electronic augmentation data that is used to generate the electronic augmentation. The electronic augmentation data is converted to human-readable text that includes letters and numbers or symbols, such as names, addresses, or product identification numbers. The augmentation data is converted to a human-readable alphanumeric text or symbols by, for instance, mapping alphanumeric characters in the augmentation marking data to matrices of pixels that represent an image of the character to be rendered on a display device. That is, the augmentation data might include a data representing a "1" or the letter "A," and the system accesses a set of standard character pixel matrices to output a human-readable character in a particular font or size.

In other cases, the electronic augmentation data is converted to images for display, such as a digital signature in script format, an enterprise or individual logo, or a security feature such as a hologram, a bar code, or a quick response ("QR") code. The electronic augmentation data can include, without limitation: (i) digital signature data; (ii) a target product identification; (iii) user contact data; (iv) authorized user identification data; (v) transfer instruction data; or (vi) image data representing a logo, symbol, barcode, or QR code.

The Augmentation Settings GUI can also be used to establish input settings used to create dynamic augmentation data. The dynamic augmentation data is used to generated electronic augmentations that can change with each instance an electronic augmentation is created and applied to a transfer instrument. For example, the user computing device might capture a time or a geographic location from an integrated GPS device, and users can input settings that cause the system to generate augmentation data that includes a date, time, or geolocation for each instance when an digital transfer instrument and/or an electronic augmentation is created. In this manner, the system can track when an electronic augmentation was created and applied to a transfer instrument and where the user computing device was located, according to data captured from an integrated GPS device. As another example, the user computing device can retrieve a hardware identification that is included within the dynamic augmentation data to identify the computing device used to create the electronic transfer instrument and the electronic augmentation.

The augmentation settings data is stored to the augmentation settings database on the provider system for use in generating augmentation data. The augmentation data is in turn used to generate electronic augmentations that are applied to, added to, or associated with, electronic transfer instruments. The augmentation data can be applied to an electronic transfer instrument by, for example, creating metadata that is appended to the file(s) representing the transfer instruments. Or alternatively, the augmentation marking data can be used to create a separate metadata file that is associated with the file(s) representing the electronic transfer instruments.

Initiating Electronic Transfers and Capturing Image Data

An example process for initiating and authorizing an electronic transfer is shown in FIG. 2. User may receive one or more physical or digital transfer instruments from third party transfer sources. The transfer instruments include transfer data that is processed by the provider to execute a transfer of resources from the third party transfer source to the user. The transfer instrument is reviewed, processed, and authorized by a user prior to initiating the transfer. Processing the transfer instrument includes performing operations that validate the transfer data and apply electronic augmentations that serve as a transfer authorization and that includes transfer instruction data used by the provider to implement the transfer.

The transfer data included within the transfer instrument can include, without limitation: (i) source identification data that names or identifies the source of the resource transfer; (ii) sequencing data, such as a date that the transfer instrument was created or data that otherwise indicates an order or sequence in which the transfer instrument was created relative to other transfers and transfer instruments; (iii) target identification data that names or identifies the user receiving the transfer; (iv) transfer value data that represents the amount or volume of resources being transferred; (v) a source signature, such as a handwritten marking or a series of alphanumeric characters or symbols used to identify the third party transfer source and that serves as a designation that the transfer is authorized by the third party; (vi) source contact data, such as a mailing address, phone number, or email address of the third party source; (vii) source provider identification data that names or identifies a provider that renders services to the third party transfer source in implementing the transfer; (viii) a transfer instrument identification, which can be an alphanumeric string of characters that is unique to the transfer instrument (e.g., a document identification number); (ix) routing data used to route the transfer from the transfer source provider to the recipient user provider; (x) a source product identification (e.g., an account number for the transfer source); and (xi) a notation data that can be alphanumeric textual content generated by the third party transfer source, such as a short narrative describing the purpose of the transfer.

The user can initiate and authorize a transfer by first launching a software application, such as a Provider Interface Application, that establishes a secure connection to the provider system. The user computing device generates one or more GUIs, such as the GUI shown in FIG. 3 that include augmentation input functions selectable by users, such as pull down menus, radio buttons, or text boxes. Users select an initiate mobile transfer function to begin the process of creating an electronic transfer instrument.

Users can enter augmentation input selection data into the augmentation input functions to enter transfer data or augmentation data prior to digitizing the transfer instrument. For example, the user computing device can display a GUI with one or more input fields, such as: (i) a user identification input field; (ii) a target product identification input field (i.e., an account to receive the transfer); (iii) a transfer value data input field; (iv) an transfer instruction data input field; and (v) other elements of transfer data that can be entered manually and used for, among other purposes, verifying transfer data that is automatically detected on the electronic transfer instrument.

At least one of the GUIs includes an image capture input function, such as the Image Capture button shown in FIG. 4. Selecting the image capture input function causes the user computing device to activate a digital camera or "image source" to capture an image that is used to digitize the transfer instrument. The transfer instrument can be digitized with the user computing device by, for example, capturing one or more images or a video of the transfer instrument using the digital camera. In other embodiments, image sources other than cameras can be used, such as electronic document scanners that generate transfer instrument content data as an image file, portable document format ("PDF")

file, or other digitized format. Each transfer instrument content file, or source image data, can depict a different portion or side of the transfer instrument (e.g., front and back) to capture all available transfer data for conversion to a digital format. The camera or other image source device can be integrated with the user computing device or connected as a separate device, such as a scanner or a portable digital camera that is in signal communication with the user computing device through a USB or other suitable cable or through a wireless connection, such Bluetooth® or NFC.

The image source device generates source image data that is processed by one or more software applications integrated with the user computing device, such as an Image Processing Module. The source image data is processed to implement functions that include, without limitation: (i) performing a content recognition analysis that determines the transfer data included within the transfer instrument through techniques such as optical character recognition ("OCR"); (ii) performing a feature recognition analysis to determine characteristics of the transfer instrument, such as physical dimensions or boundary edge locations; (iii) a segment analysis that determines various components of the transfer instrument image and identifies elements of transfer data within the transfer instrument; (iv) a placement analysis to find a suitable location for placement and display of electronic augmentations; (v) rendering electronic augmentations as an overlays on displayed images of the transfer instrument; (vi) performing an electronic augmentations integration operation that associates, correlates, integrates, or appends the augmentation data with or to the transfer instrument content data for later processing by the provider; and (vi) performing image enhancement operations to improve accuracy of human or machine reading of the transfer instrument, such as sharpening the image, de-skewing the image, de-speckling the image, reorienting the image, de-warping the image, converting the image to greyscale or black-and-white colorization (i.e., binarization), or adjusting the color, among other functions.

The transfer instrument content data, or source image data, can be static image data, such as when the camera captures a photographic image of the transfer instrument at an instant in time. The source image data can also be dynamic image data where the camera generates a continuous feed of image data (i.e., sequential static image frames) rendered on a display device that is integrated with the user computing device (i.e., a video stream depicting the transfer instrument displayed on a touch screen). Providing a continuous stream of dynamic image data allows the user to align the camera with the transfer instrument before capturing an image. Better alignment of the camera and the transfer instrument helps ensure that the augmentation content data represents a more accurate and complete depiction of the transfer instrument, including any transfer data within the transfer instrument.

When capturing an image, the user computing device display can be configured to render a visual guide, such as a box, outline, or partial corners of a rectangle shown in FIG. 4. Users align the visual guide with the transfer instrument shown on the computing device display, such as placing the transfer instrument within the visual guide, before selecting an image capture function to generate source image data representing a still image of the transfer instrument. The visual guides help ensure optimal orientation of the transfer instrument within the image and also help ensure that the camera is an optimal distance from the transfer instrument.

Optimizing the distance between the camera and the transfer instrument results in the transfer instrument occupying a desired proportion of the overall image size, such as locating the edges of the transfer instrument a pre-determined number of pixels away from each side boundary of the image. The system can then more efficiently crop the image to eliminate pixels that are located near the boundaries of the image and outside the edges of the transfer instrument. Cropping the image reduces the size of the image data file for faster transmission over a network and eliminates potential background "noise" near the edges of the image that could interfere with subsequent image processing and possibly be mistaken for transfer data.

Any suitable edge detection techniques can be employed to determine the edges of the transfer instrument and to facilitate image cropping. Edge detection can be utilized both before and after capturing an image of the transfer instrument. Before capturing an image, if all edges of the transfer instrument are not detected within the image data, the user computing device can display a notification or an indicator to the user notifying the user that the entirety of transfer instrument might not be within the boundaries of the image. Similarly, if all edges of the transfer instrument are not detected within a captured image, the user computing device can display a notification to the user and prompt the user to capture a replacement image.

To perform edge detection, in one embodiment, an Image Processing Module software component first converts the image to black and white pixels with each pixel having position data (e.g., X-Y coordinates) and a brightness value indicating how light or how dark the pixel is to be displayed. The Image Processing Module analyzes adjacent rows and columns of pixels to determine abrupt changes in the brightness values that represent edges of the transfer instrument. The Image Processing Module can streamline the edge detection process by starting the analysis at locations where edges are expected, such as positions proximal to the visual guide locations or positions located a certain number of pixels away from the edge of the image.

In one example of edge detection, three locations where edges are expected are examined to find a top left corner, a top right corner, and a bottom edge of the transfer instrument. For each of the corners or edges that are detected, a byte array is created, a histogram of the array is generated, and a binary black-and-white image is generated so that a horizontal line can be found for each of the top left corner, top right corner, and bottom edge. Similar operations are used to determine a vertical line for the top left and right corners. Following edge detection, the Image Processing Module can analyze the image data to ensure that the entire transfer instrument was captured within the image boundaries.

The user computing device or provider terminal that is being used to capture the image can also utilize anti-motion techniques to help ensure the image source device or camera is steady as images of the transfer instrument are captured. The result is a more sharp and more clear image. Any suitable anti-motion techniques can be utilized. In one example embodiment, an edge detection analysis is performed on successive image frames captured by the camera (e.g., every frame, every other frame, or every "x" number of frames to reduce processing requirements). If the edge detection analysis indicates that the locations of transfer instrument edges change by a predetermined threshold from one frame to the next (e.g., change by more than "x" number of pixels), the change is interpreted as unacceptable camera movement that could result in a poor image quality. The user computing device can then disable the image capture input function until movement falls within acceptable limits or display a notification to the user that camera movement should be eliminated as the movement could result in reduced image quality.

In yet another embodiment, the user computing device can include an integrated accelerometer that outputs positional data at periodic intervals of time. Changes in the positional data above a certain threshold can be interpreted as unacceptable camera movement that could result in a poor image quality. Again, the user computing device can then disable the image capture input function until movement falls within acceptable limits (e.g., the position data does not change above a predetermined threshold for a predetermined amount of time), or the user computing device can display a notification to the user recommending that camera the movement be reduced.

Once an image is captured, the image data can be converted and/or stored in one or more suitable image data formats, such as a JPEG compliant format, a TIFF format, a bitmap format, or a SVG image format. In some embodiments, the camera device captures images in a first image data format, such JPEG, that is then converted to another format with a smaller file size to facilitate transmission of the image data between computing devices. The provider computing system may convert the image data representing the transfer instrument into a binary interchange format, such as the DSTU X9.37-2003 file format, prior to transmitting the digitized transfer instrument to a third party, such as an automated clearing house.

Those of skill in the art will recognize that capturing an image is not the only method available for digitizing a physical transfer instrument. In other embodiments, the transfer instrument can be digitized in whole or in part using a document scanner or by entering transfer data into a GUI. For instance, a user can manually enter transfer data read from the transfer instrument into a GUI, and the system can generate file(s) that represent the transfer instrument, such as a data file (e.g., a .dat file), a hypertext language markup file (e.g., a .html or xml file), a comma-separated value file (e.g., a .csv file), a portable document format file (e.g., a PDF file), or a template/standardized image representing a transfer instrument (e.g., a JPEG or TIFF image resembling generic check).

A hybrid of digitization methods can be used where, for example, not all of the transfer data can be determined by analyzing an image of the transfer instrument. In that case, the computing device display can generate and show a notification to the user stating that one or more elements of the transfer data could be not determined from the image if, for example, the transfer instrument is folded or damaged in a manner that conceals transfer data or handwritten transfer data is of poor quality and cannot be read. The computing device can also render a GUI that allows the user to input missing transfer data.

The system (i.e., a user computing device, provider terminal computing device, or a provider network computing device) can process source image data using a content recognition analysis to conduct an initial assessment regarding the quality of a digital image showing a transfer instrument. In particular, the initial assessment can determine readability of the transfer data contained on the transfer instrument. For example, the system can determine whether the product identification, the transfer value data, or other transfer data is readable such that it may be parsed or otherwise obtained and processed by the provider to execute the transfer. The initial quality assessment can be performed after a user captures all required images of the transfer instrument.

If the quality is confirmed, the user is prompted to confirm that the transaction is authorized and that electronic augmentations applied to the image are correct. Alternatively, the initial quality assessment can be performed after a first image of the transfer instrument is generated (i.e., a front side of the transfer instrument), and if the quality is confirmed as acceptable, the user computing device can generate a prompt instructing the user to capture a subsequent image of the transfer instrument (e.g., the back side of the transfer instrument).

While receiving a continuous video feed of dynamic image data, the user computing device captures single, static image of the transfer instrument in response to user selection of an input function that causes the user computing device to store a single frame of image data to transitory or non-transitory storage. The edge detection, content recognition, initial quality assessment, and enhancement operations (discussed below) are used to process static image data. The user can be required to capture multiple static images of a transfer instrument to ensure all the relevant transfer data is captured for generating the electronic transfer instrument.

In other embodiments, the system is configured with a "continuous-capture" mode that uses dynamic image data (i.e., a video feed) to implement dynamic, real-time generation of electronic transfer instruments. The continuous capture mode eliminates the need for users to select input functions that capture multiple sides of a transfer instrument. Moreover, by utilizing a continuous feed of image data, the quality of the electronic transfer instrument image is enhanced because it does not depend on users to capture a single, high quality image.

For continuous capture, the system continuously processes the dynamic image data feed (i.e., the video feed) using edge detection, content recognition, segment classification, initial quality assessment, or enhancement software processing techniques. The integrated image source, or camera, is set to capture the dynamic image data feed while the user physically manipulates the transfer instrument within the field of view of the camera lens to ensure all transfer data and all required sides of the transfer instrument are captured within the dynamic image data feed. Alternatively, the user computing device or camera are moved about the transfer instrument while maintaining the transfer instrument within the camera lens field of view to ensure thorough capture of the transfer data and transfer instrument.

As the transfer instrument is captured within the dynamic image data feed, the system continuously processes the sequential images comprising the image data feed to detect the edges of the transfer instrument and to recognize elements of the transfer data. Rather than processing each sequential image within the dynamic image data feed, some embodiment can analyze static images at pre-determined, periodic intervals to optimize efficiency and reduce required processing time (e.g., process every fifth static image frame or every tenth static image frame, etc.).

The system utilizes content recognition techniques to detect and convert image data to machine encoded content elements, such as individual characters, letters, numbers, symbols, or images within the transfer instrument to ensure the transfer data can be read. That is, within the image data, the system discerns and identifies individual characters. The system then utilizes a segment analysis to group machine encoded content elements by transfer instrument component so various elements of the transfer instrument can be identified, such as recognizing the product identification, routing data, or transfer value data whether handwritten or typed.

The segment analysis can also extract known features of the transfer instrument associated with components or sides of the transfer instrument. For instance, where the text string "pay to the order of" is known to always be on a front or first side of the transfer instrument, the system analyzes each frame of image data to detect that particular string. When detected, the system recognizes that the frame of image data represents the front or first side of the transfer instrument. As another example, in some cases it is known that the text string "endorse here" always appears on the rear, or second, side of the transfer instrument such that when that text is recognized, the system designates the image data as representing the second side of a transfer instrument.

In continuous capture mode, the system continuously processes the dynamic image data feed until the system captures at least one static image of acceptable quality for each side of the transfer instrument. When a static image is detected that meets predetermined image data quality thresholds, the static image is stored to memory for subsequent use in generating the electronic transfer instrument. The image data quality thresholds can include, for instance: (i) detecting all four, or three out of four, edges for a transfer instrument; (ii) recognizing a threshold percentage of all machine encoded content elements; (iii) detecting all expected components segments of the transfer instrument; and/or (iv) reading and converting all expected transfer data elements.

In one embodiment, the system can maintain a database record or list of expected components or transfer data elements. That is, the system is configured to recognize that a transfer instrument must have certain required or expected components or transfer data elements, such as sequencing data (i.e., a date), routing data, a product identification (e.g., an account number), a transfer source identification (i.e., a payer), an augmentation having a transfer source identification and/or transfer data instructions, among other transfer data elements.

For each static image frame within the continuous stream of dynamic image data, the system processes the sequential dynamic transfer instrument images to read and convert the machine encoded content elements and then extract transfer data by grouping machine encoded content elements into transfer data elements. The system compares the extracted transfer data elements for each image against the database of expected transfer data elements until all expected or required transfer data elements are detected for each side of the transfer instrument image. The system can perform additional processing steps, such as detecting edge boundaries for the transfer instrument images or segmenting the transfer instrument image into a plurality of components and checking against a database or list of expected components. When all edge boundaries are detected, and the expected (or required) transfer data elements (or transfer instrument components) are detected on a first side of the transfer instrument image, the system stops processing images of the first side of the transfer instrument. The system stores to memory the first accepted transfer instrument image that included all edge boundaries and the expected (or required) transfer data elements. The accepted transfer instrument image is used to generate the electronic transfer instrument.

The system next begins processing images of the second side (or next side if the second side was processed) of the transfer instrument when such images are available in the dynamic image data stream. Again, the system can process each static image frame or static image in the dynamic image data stream to detect edge boundaries for the second side of the transfer instrument. If edge boundaries are detected for the transfer instrument second side, the system further reads and converts machine encoded content elements and extracts transfer data by grouping machine encoded transfer data elements into transfer data elements. The system compares the extracted transfer data elements against a database of expected (or required) transfer data elements until all expected transfer data elements have been detected in a static image of the transfer instrument second side. The system stores to memory the first accepted second side transfer instrument image having all the expected transfer data elements so the accepted second side transfer instrument image can be used to generate the electronic transfer instrument. When images of all sides of the transfer instrument having transfer data have been analyzed and expected transfer data elements detected for all sides, the system stops processing the dynamic image data stream.

Those of skill in the art will appreciate that other measures of image data quality can be used, such as determining the sharpness (i.e., contrasts in brightness between adjacent groups of pixels) or noise (i.e., random variations in brightness or color information) in the image data and only accepting images having predetermined thresholds for acceptable sharpness or noise. Noise in digital images can include, without limitation, Gaussian noise, Rayleigh noise, salt and/or pepper noise, and impulse noise, among other types. Noise detection analyzes the color, brightness, or other properties of a pixel as compared to nearby pixels where pixels having characteristics that vary significantly compared to nearby pixels are taken as noise.

Noise reduction techniques can include running an edge adaptive spatial low pass filter over an image while using an edge detector to protect some of the edge boundaries. Another way to improve signal to noise ratios ("SNR") is by temporally combining matching parts from two or more images by applying a temporal filter (e.g. a Motion Compensated Temporal Filtering). Gaussian noise reduction techniques can include mean filtering or Wiener filtering. Non-linear filters, such as median filtering and weighted median filtering, suppress noise without any identification. Bilateral filtering is a non-linear, edge-preserving, and noise-reducing smoothing technique that replaces the intensity value of each pixel with a weighted average of intensity values from nearby pixels. Spatial noise reduction techniques can include total variational regularization, non-local regularization, sparse representation, and low rand minimization techniques.

Transform domain de-noising techniques first transform the given noisy image to another domain, and then they apply a de-noising procedure on the transformed image according to the different characteristics of the image and its noise. Transform domain techniques include, without limitation, independent component analysis and MB3D. Neural networks can also be used for noise reduction where optimization techniques are employed, such as use of convolutional neural networks, multi-layer perception models, or deep learning networks. Those of skill in the art will appreciate the above examples of noise recognition and correction techniques are not intended to be limiting, and other techniques can be used.

When one or more images satisfying the image data quality threshold are captured an stored for a given side of the transfer instrument, the system continues processing the dynamic image data feed until each side of the transfer image has been processed. The one or more images for each side of the transfer instrument meeting the image data quality thresholds are then stored to the user computing device memory for use in creating the electronic transfer instrument.

The transfer instrument image data, or the generated electronic transfer image, can be stored to an electronic storage device integrated with the user computing device or uploaded to a remote location, such as a cloud storage location or the provider system. The electronic transfer instrument can then be processed to implement the electronic transfer at a later time, or the electronic transfer instrument can be transmitted by email, text message, or other remote communication means to another party, such as the target transfer recipient. That is, a source user can generate the transfer instrument, capture one or more images, and transmit the image data to another party that is the recipient of the transfer, thereby eliminating the need to hand another party a physical, printed transfer instrument.

Permitting storage and later processing of the electronic transfer instrument or transfer instrument image data has the advantages of, for instance, allowing a user to capture an image of the transfer instrument when lighting conditions are favorable, when convenient for a user, using a first device having an integrated camera, or even when the user computing device does not have a network or Internet connection. The user can then initiate the transfer subject to the electronic transfer instrument when network connection is restored, when the transfer is convenient, when the user has an opportunity to verify that the resources are available, or using a separate device than was used to capture the image data. The transfer can be initiated using a user computing device by, for example, uploading the transfer instrument image data to the provider system through a provider website or using a provider mobile application. The user can also send the transfer instrument image data or electronic transfer instrument to another party that initiates the electronic transfer.

Transfer Instrument Security and Validation

The system can perform an error detection analysis to detect potential errors in the transfer data. For example, the system might determine that the source identification data has a value of "customer 1" and the transfer value data yields a value of "$10." The user computing device can display a GUI that prompts the user to enter expected source identification data and expected transfer value data. The system compares the expected values against the values determined through the content recognition analysis. A match between the user-entered expected data values and the determined data values is taken as an indicator that the transfer data was properly determined through the content recognition analysis. If the expected data values and the determined data values do not match, the transfer can be automatically terminated, or the user can be notified and prompted to confirm whether the transfer is still authorized.

The error detection analysis can also be configured to verify the presence of particular features within the image data representing the transfer instrument. To illustrate with a simplified example, a transfer instrument may require routing data both in the lower left of a first (front) side of the transfer instrument and in the upper left of a second (back) side of the transfer instrument. Further, it might be known that the routing data must include nine (9) numeric characters. The system performs a content recognition analysis and a segment analysis to identify the segments where the routing data is located and to identify the machine encoded content elements that comprise the routing data. If the content recognition and segment classification analyses do not identify nine (9) numeric characters in the expected locations, the user computing device can notify the user that the transfer cannot be completed, or prompt the user to capture new images.

Continuing with the foregoing example, the user computing device can be configured to specifically prompt the user to capture a first image of the first/front side of the transfer instrument and then next capture a second image of the second/back side of the transfer instrument. If the content recognition and segment classification analyses determine that the first image includes a nine (9) digit numeric value in the upper right of the image (where the value was expected in the lower right), then the user computing device can display a notification to the user that the order of the image captures might have been reversed.

The error detection analysis can also provide a measure of security and accuracy by validating data determined from the content recognition analysis, segment classification, and transfer data extraction against known data stored to a provider system. One example includes verifying the user identification or product identification for the electronic transfer recipient or account. A user computing device accepts authentication data, such as a user name, password, PIN code, or biometric data that is transmitted to a provider with system configuration data to verify the user and device and to determine an user identification.

Following the verification analysis, some embodiments retrieve additional elements of end user data that can be verified against transfer data or augmentation data included as part of an electronic transfer instrument. The provider system can include an end user database that stores end user data that includes, without limitation: (i) co-authorized user identifications where more than one end user owns, or is authorized to access, a given product; or (ii) user contact data, such as a mailing address for an end user. The system can further retrieve elements of augmentation data to be verified as part of error detection, such as a digital signature.

After capturing an image of a transfer instrument, the system compares the user identification determined as part of the verification analysis to the transfer data on the transfer instrument, such as a user identification adjacent to a machine encoded content element string "pay to the order of." If the user identifications match, or if the user identification on the transfer instrument matches a known co-authorized user identification, the system proceeds with creating an electronic transfer instrument. If the user identification do not match, the system can display a notification to the user indicating that the user identification could not be validated. The system can provide users with the option to acknowledge the notification and proceed with the transaction, or the system can deny the transaction and terminate the process of creating the electronic transfer instrument.

The system can also compare augmentation data against known end user data, such as comparing a user identification determined by the provider identity management service against user identification data include in the augmentation data. This can be useful where, for example, the augmentation is generated by conventional techniques and is a handwritten or stamped "endorsement" on the transfer instrument. In that case, the augmentation is not generated electronically from known data. The augmentation includes a signature, address, name, transfer instructions, and a product identification. The user computing device performs a content recognition analysis to determine the characters that comprise the augmentation or "endorsement." The segment classification analysis and transfer analysis identify the symbols, or images within the augmentation as comprising an user identification, a signature, user contact data, a product identification, or transfer instruction data. The information from the augmentation is then compared against a known user identification, digital signature, product identification, contact information, user contact data, or the like that is stored to the provider system. In this manner, the information on the endorsement or augmentation can be validated prior to transmitting the electronic transfer instrument to a third party for processing.

Following content recognition and error detection, the system can apply an electronic augmentation to the transfer instrument by both: (i) appending, associating, or correlating augmentation marking data with or to file(s) representing the digitized transfer instrument; and (ii) rendering an electronic augmentation on an image of the transfer instrument that is shown on the display of the user computing device. The electronic augmentation can be automatically applied based on the previously entered augmentation settings data stored to the augmentation settings database. In some embodiments, the an electronic augmentation and augmentation marking data can be generated by also utilizing augmentation settings data entered by a user or captured from the user computing device at or near the time that the transfer instrument is digitized.

When rendering the an electronic augmentation on the transfer instrument image, the system can perform a positioning analysis to determine a proper location to place and display the an electronic augmentation. The position analysis can utilize a combination of edge detection techniques, feature recognition analysis, content recognition analysis, and segment analysis. In some cases, providers or third parties that process an electronic transfer instrument (e.g., an automated clearing house) may require that a an electronic augmentation be placed at or near a specific position on the transfer instrument. The position analysis identifies and determines the location of relative marking characters, such as particular alpha numeric characters that serve as a marker for a position where an electronic augmentation should be applied.

The electronic augmentation position can be denoted by symbols or alphanumeric text on the transfer instrument detected through content recognition and a segment analysis, such as an "X" adjacent to an elongated line (e.g., "X."), text stating "mark here," an elongated line near text stating "do not mark below this line," or another suitable position designation. It might also be known that a required an electronic augmentation position is generally located on a first or second side of the transfer instrument and in a specific position, such as approximately "X" number of pixels away from an edge of the transfer instrument. The example shown in FIG. 4 illustrates an embodiment where the required position is located on a second side of the transfer image near two arrows and text stating "do not mark below this line."

In the foregoing examples, the Image Processing Module performs a placement analysis to determine placement data that corresponds to a location for the placement of an electronic augmentation on the image. The placement analysis can use an edge detection analysis to determine the positions near the edge of the transfer instrument. The edge detection analysis can be streamlined by, for example, examining an expected position that is a certain number of pixels away from the left boundary of the image data.

The augmentation image data is generated from augmentation settings data stored to the augmentation settings database on a remote system, such as the provider system or a third-party SaaS or cloud service provider. The electronic augmentation can also be generated using augmentation selection data input by a user. The user computing device or terminal computing device receive the augmentation data transmitted from the remote system in any suitable file format known to those of skill in the art, such as a metadata file, a PDF file, a XML, a HTML file, or a text file (e.g., a .txt file), among other potential formats.

In some embodiments, the augmentation marking data can be determined in whole or in part from data input by the user at or near the time the transfer instrument is digitized. To illustrate, a user can select an "initiate transfer" input function on a GUI displayed on a user computing device. Selecting the initiate transfer function can display a GUI that prompts the user to enter transfer data or augmentation data, such as a product identifier or transfer instruction data. In this manner, a user can determine at the time of the electronic transfer which account will receive the transfer, and the augmentation marking data can be generated accordingly to include the proper product identification data and transfer instruction data. The system can be configured to run electronic augmentation data checks by, for instance, analyzing augmentation data to determine whether a user is authorized to create a marking with specified transfer instruction data before generating the electronic augmentation for display.

The electronic augmentation can be rendered as being overlaid on the transfer instrument image either prior to capturing an image or after the image is captured. That is, while a user is positioning the camera relative to the transfer instrument in preparation for capturing a still image, the user or terminal computing device display can render a continuous stream of dynamic image data showing the transfer instrument (i.e., a video). The continuous image stream can be augmented with the electronic augmentation along with the visual guide discussed above. In this manner, the user can review the accuracy of the augmentation marking data while at the same time position the electronic augmentation on the transfer instrument in a manner that does not interfere with content on the transfer instrument.

After the user selects an image capture input function to generate a still image, the computing device can display the still image of the transfer instrument with the electronic augmentation overlaid on the transfer instrument and appearing to be part of, or printed on, the transfer instrument. Thus, the user has another opportunity to review the accuracy and position of the electronic augmentation prior to authorizing the electronic transfer. The user can be presented with the opportunity to edit the augmentation data if there is a discrepancy. For example, the name or user identification adjacent to the "pay to the order of" field may be different than a user identification set forth in the augmentation data. In that case, the user can edit the user identification data in the augmentation to match the "pay to the order of" field to avoid errors with transfer instrument processing. After accepting the image and authorizing the transfer, the system can store the image of the transfer instrument with the electronic augmentation embedded in the image.

Conventional systems generally apply electronic augmentations after a digitized transfer instrument is transmitted to a provider or third party system for processing. Thus, errors or irregularities in the electronic augmentations may not be detected until after an electronic transfer is denied, thereby leading to further delays in transfer processing. The present systems overcomes such disadvantages by allowing users to customize and review electronic augmentations prior to authorizing an electronic transfer and transmitting the digitized transfer instrument to a provider or third party for processing. The result is a more efficient process for electronic transfers that saves time, facilitates consistency, and reduces errors in electronic transfer processing.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for electronic transfer instrument security and error detection comprising a computer including at least one processor and a memory device that stores data and executable code that, when executed, causes the at least one processor to:

(a) transmit system configuration data to a network computer that compares the system configuration data to stored system configuration and returns end user data;

(b) activate a camera electrically connected or integrated with the computer, wherein the camera captures image data that comprises a transfer instrument image;

(c) read and convert the image data to identify text characters on the transfer instrument image by performing operations comprising (i) converting the source image data to black and white pixels, each pixel having a pixel coordinate position and a brightness value, (ii) segmenting the source image data into one or more regions, (iii) detecting boundary edges of the transfer instrument image by detecting changes in pixel brightness values above a brightness value threshold, (iv) processing the transfer instrument image to detect one or more dataset arrays identifying clusters of pixels, (v) feeding the one or more dataset arrays to a cluster extraction analysis to identify text characters on the transfer instrument image, (vi) wherein the computer comprises a neural network and the neural network is used to assist in one or more of the processing steps to convert the image data to machine encoded content elements;

(d) segment the transfer instrument image into a plurality of components, wherein (i) each component comprises a map index corresponding to a location of the component within the transfer instrument image, and (ii) at least some components comprise a transfer data elements;

(e) extract a transfer data element from the transfer instrument image where the processor (i) uses the map index to locate a component, and (ii) reads the machine encoded content elements from the component, and (iii) converts groups of machine encoded content elements to an extracted transfer data element;

(f) compare the extracted transfer data elements against the end user data, wherein (i) when the extracted transfer data element does not match the end user data, a notification is displayed by the computer, and (ii) when the extracted transfer data element does match the end user data, the transfer instrument image is used to generate an electronic transfer instrument.

2. The system for electronic transfer instrument security and error detection of claim 1, wherein:

(a) the end user data comprises an user identification;

(b) the extracted transfer data element comprises a target identification; and (c) the processor detects errors with the target of the electronic transfer instrument by comparing the target identification to the user identification.

3. The system for electronic transfer instrument security and error detection of claim 1, wherein:

(a) the extracted transfer data element comprises a transfer value;

(b) a user enters an expected transfer value into an input function displayed by the computer; and (c) the processor detects errors with the amount of a transfer by comparing the transfer value to the expected transfer value.

4. The system for electronic transfer instrument security and error detection of claim 1, wherein:

(a) the end user data comprises a co-user identification;

(b) the extracted transfer data element comprises a target identification; and (c) the processor detects errors with the target of the electronic transfer instrument by comparing the target identification to the co-user identification.

5. The system for electronic transfer instrument security and error detection of claim 1, wherein:

(a) the end user data comprises an authorized user identification;

(b) the plurality of components comprises an augmentation;

(c) the processor extracts a transfer data element from the augmentation, wherein the extracted transfer data element is an target identification; and (d) the processor compares the target identification to the authorized user identification, wherein when the target identification does not match the authorized user identification, an error notification is displayed by the computer.

6. The system for electronic transfer instrument security and error detection of claim 1, wherein an end user can utilize the computer to modify the augmentation to match the target identification to the authorized user identification.

7. The system for electronic transfer instrument security and error detection of claim 1, wherein the neural network has an architecture selected from one of a CNN architecture or a recurrent neural network architecture.

8. The system for electronic transfer instrument security and error detection of claim 1, wherein:

(a) the neural network executes a clustering analysis; and (b) the neural network comprises a neural network architecture selected from one of a convolutional neural network, a Hopefield network, a Boltzmann Machine, a Helmholtz Machine, a Kohonen Network, a Self-Organizing Map, or a Centroid Neural Network.

9. The system for electronic transfer instrument security and error detection of claim 1, wherein:

(a) the computer comprises a neural network; and (b) the neural network is used to segment the transfer instrument image.

10. The system for electronic transfer instrument security and error detection of claim 9, wherein the neural network segments the transfer instrument image using a model selected from a LDA, Non-Matrix Factorization, Correlated Topic Model, or KMeans clustering.

11. A system for electronic transfer instrument security and error detection comprising a computer including at least one processor and a memory device that stores data and executable code that, when executed, causes the at least one processor to:

(a) transmit user security data to a network computer that compares the received user security data to stored user security data and returns end user data;

(b) activate a camera integrated or connected with the computer, wherein the camera captures image data that comprises a transfer instrument image;

(c) read and convert the image data to identify text characters on the transfer instrument image, comprising (i) converting the source image data to black and white pixels, each pixel having a pixel coordinate position and a brightness value, (ii) segmenting the source image data into one or more regions, (iii) detecting boundary edges of the transfer instrument image by detecting changes in pixel brightness values above a brightness value threshold, (iv) processing the transfer instrument image to detect one or more dataset arrays identifying clusters of pixels, (v) feeding the one or more dataset arrays to a cluster extraction analysis to identify text characters on the transfer instrument image, (vi) wherein the computer comprises a neural network and the neural network is used to assist in one or more of the processing steps to convert the image data to machine encoded content elements;

(d) convert groups of machine encoded content elements to extracted transfer data;

(e) compare the extracted transfer data against the end user data, wherein (i) when the transfer element does not match the end user data, a notification is displayed by the computer, and (ii) when the transfer element does match the end user data, the transfer instrument image is used to generate an electronic transfer instrument.

12. The system for electronic transfer instrument security and error detection of claim 11, wherein:

(a) the neural network executes a clustering analysis; and (b) the neural network comprises a neural network architecture selected from one of a convolutional neural network, a Hopefield network, a Boltzmann Machine, a Helmholtz Machine, a Kohonen Network, a Self-Organizing Map, or a Centroid Neural Network.

13. The system for electronic transfer instrument security and error detection of claim 11, wherein the neural network has an architecture selected from one of a CNN architecture or a recurrent neural network architecture.

14. The system for electronic transfer instrument security and error detection of claim 13, wherein:

(a) the end user data comprises an user identification;

(b) the extracted transfer data element comprises a target identification; and (c) the computer detects errors with the target of the electronic transfer instrument by comparing the target identification to the user identification.

15. The system for electronic transfer instrument security and error detection of claim 13, wherein:

(a) the extracted transfer data element comprises a transfer value;

(b) a user enters an expected transfer value into an input function displayed by the computer; and (c) the computer detects errors with the amount of a transfer by comparing the transfer value to the expected transfer value.

16. The system for electronic transfer instrument security and error detection of claim 13, wherein:

(a) the end user data comprises an authorized user identification;

(b) the plurality of components comprises an augmentation;

(c) the computer extracts a transfer data element from the augmentation, wherein the extracted transfer data element is an target identification; and (d) the computer compares the target identification to the authorized user identification, wherein when the target identification does not match the authorized user identification, an error notification is displayed by the computer.

17. A system for electronic transfer instrument security and error detection comprising a computer including at least one processor and a memory device that stores data and executable code that, when executed, causes the at least one processor to:

(a) activate a camera that captures image data that comprises a transfer instrument image;

(b) convert the image data to machine encoded content elements to identify text characters on the transfer instrument image;

(c) segment the transfer instrument image into multiple components, wherein at least some components include transfer data elements comprised of the machine encoded content elements;

(d) extract transfer data elements from the transfer instrument image by reading the machine encoded content elements from one or more components and converting groups of the machine encoded content elements within each component to an extracted transfer data element, by performing operations comprising (i) converting the source image data to black and white pixels, each pixel having a pixel coordinate position and a brightness value, (ii) segmenting the source image data into one or more regions, (iii) detecting boundary edges of the transfer instrument image by detecting changes in pixel brightness values above a brightness value threshold, (iv) processing the transfer instrument image to detect one or more dataset arrays identifying clusters of pixels, (v) feeding the one or more dataset arrays to a cluster extraction analysis to identify text characters on the transfer instrument image, (vi) wherein the computer comprises a neural network and the neural network is used to assist in one or more of the processing steps to convert the image data to machine encoded content elements;

(e) compare the extracted transfer data elements against the end user data, wherein (i) when the extracted transfer data element does not match the end user data, a notification is displayed by the computer, and (ii) when the extracted transfer data element does match the end user data, the transfer instrument image is used to generate an electronic transfer instrument.

18. The system for electronic transfer instrument security and error detection of claim 17, wherein the electronic transfer instrument comprises a single combined image file that, when displayed, renders the extracted transfer data elements and components.

* * * * *